US011638130B2

(12) United States Patent
Thagadur Shivappa et al.

(10) Patent No.: US 11,638,130 B2
(45) Date of Patent: Apr. 25, 2023

(54) RENDERING OF SOUNDS ASSOCIATED WITH SELECTED TARGET OBJECTS EXTERNAL TO A DEVICE

(71) Applicant: Qualcomm Incorporated, San Diego, CA (US)

(72) Inventors: Shankar Thagadur Shivappa, San Diego, CA (US); Bijan Forutanpour, San Diego, CA (US); Phi Hung Nguyen, San Diego, CA (US)

(73) Assignee: Qualcomm Incorporated

( * ) Notice: Subject to any disclaimer, the term of this patent is extended or adjusted under 35 U.S.C. 154(b) by 291 days.

(21) Appl. No.: 16/720,639

(22) Filed: Dec. 19, 2019

(65) Prior Publication Data

US 2020/0204966 A1 Jun. 25, 2020

Related U.S. Application Data

(60) Provisional application No. 62/783,887, filed on Dec. 21, 2018.

(51) Int. Cl.
*H04R 5/02* (2006.01)
*H04S 7/00* (2006.01)
(Continued)

(52) U.S. Cl.
CPC .............. *H04W 4/40* (2018.02); *G01S 19/51* (2013.01); *G06F 3/013* (2013.01); *G06T 7/20* (2013.01);
(Continued)

(58) Field of Classification Search
CPC ....... H04W 4/40; H04W 4/023; H04W 76/10; H04W 84/18; H04W 4/44; H04W 4/46; H04W 4/80; G01S 19/51; G01S 5/0072; G01S 19/48; G06F 3/013; G06T 7/20; G06T 7/70; G10L 19/00; H04R 1/025;
(Continued)

(56) References Cited

U.S. PATENT DOCUMENTS

2007/0162550 A1* 7/2007 Rosenberg .............. H04L 51/04
709/206
2009/0226001 A1 9/2009 Grigsby et al.
(Continued)

OTHER PUBLICATIONS

International Search Report and Written Opinion—PCT/US2019/068074—ISA/EPO—dated Mar. 25, 2021.

*Primary Examiner* — Marcos L Torres
(74) *Attorney, Agent, or Firm* — Espartaco Diaz Hidalgo

(57) ABSTRACT

The techniques disclosed herein include a first device including one or more processors configured to detect a selection of at least one target object external to the first device, and initiate a channel of communication between the first device and a second device associated with the at least one target object external to the first device. The one or more processors may be configured to receive audio packets, from the second device, in response to the selection of at least one target object external to the device, decode the audio packets, received from the second device, to generate an audio signal. The one or more processors may be configured to output the audio signal based on the selection of the at least one target object external to the first device. The first device includes a memory, coupled to the one or more processors, configured to store the audio packets.

27 Claims, 15 Drawing Sheets

(51) Int. Cl.
| | |
|---|---|
| *H04W 4/40* | (2018.01) |
| *G10L 19/00* | (2013.01) |
| *G06T 7/70* | (2017.01) |
| *G06F 3/01* | (2006.01) |
| *H04R 1/02* | (2006.01) |
| *H04W 76/10* | (2018.01) |
| *H04W 4/02* | (2018.01) |
| *G01S 19/51* | (2010.01) |
| *G06T 7/20* | (2017.01) |
| *H04W 84/18* | (2009.01) |

(52) U.S. Cl.
CPC ................ *G06T 7/70* (2017.01); *G10L 19/00* (2013.01); *H04R 1/025* (2013.01); *H04R 5/02* (2013.01); *H04S 7/303* (2013.01); *H04W 4/023* (2013.01); *H04W 76/10* (2018.02); *H04R 2499/13* (2013.01); *H04S 2400/11* (2013.01); *H04W 84/18* (2013.01)

(58) Field of Classification Search
CPC .. H04R 5/02; H04R 2499/13; H04R 2420/07; H04S 7/303; H04S 2400/11; H04M 2201/42; H04M 2203/2094; H04M 2242/30

See application file for complete search history.

(56) References Cited

U.S. PATENT DOCUMENTS

2016/0182436 A1* 6/2016 Suzuki .................... H04W 4/21
709/206
2018/0352070 A1 12/2018 Eichfeld \* cited by examiner

RENDERING OF SOUNDS ASSOCIATED WITH SELECTED TARGET OBJECTS EXTERNAL TO A DEVICE

CLAIM OF PRIORITY UNDER 35 U.S.C. § 119

The present Application for Patent claims priority to Provisional Application No. 62/783,887 entitled "RENDERING OF SOUNDS ASSOCIATED WITH SELECTED TARGET OBJECTS EXTERNAL TO A DEVICE" filed Dec. 21, 2018, and assigned to the assignee hereof and hereby expressly incorporated by reference herein.

TECHNICAL FIELD

This application is related to rendering of sounds associated with selected target objects external to first device.

BACKGROUND

The following relates generally to wireless communication, and more specifically to vehicle-to-everything control channel design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). In addition, wireless communication systems may include support networks used for vehicle based communications. For example, vehicle-to-vehicle (V2V) and vehicle-to-infrastructure (V2I) communication are wireless technologies that enable exchange of data between a vehicle and its surroundings. Collectively, V2V and V2I is referred to as vehicle-to-everything (V2X). V2X uses a communications wireless link for fast-moving objects, e.g., like vehicles. Recently, V2X communications cellular V2X (C-V2X) has emerged to differentiate it from the WLAN based V2X.

The 5G Automotive Association (5GAA) has promoted C-V2X. C-V2X was initially defined in LTE Release 14 and was designed to operate in several modes: (a) Device-to-device (V2V); (b) Device-to-cell-tower (V2I); and (c) device-to-network (V2N). In 3GPP Release 15, C-V2X includes support for both V2V and traditional cellular-network based communication, and the functionality was expanded to support the 5G air interface standard. The PC5 interface in C-V2X allows for direct communication (via a "sidelink channel") between a vehicle and other devices without the use of a base station.

Vehicle based communication networks may provide always-on telematics where UEs, such as vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may also be used between vehicles to improve the safety of self-driving cars.

V2X and C-V2X allow for diverse applications to emerge including the ones described in this disclosure.

SUMMARY

In general, this disclosure describes techniques related to rendering of sounds associated with selected target objects external to first device. In one example, the disclosure describes a first device for initiating communication with a second device, the first device including one or more processors configured to detect a selection of at least one target object external to the first device, initiate a channel of communication between the first device and a second device associated with the at least one target object external to the first device. The one or more processors may be configured to receive audio packets, from the second device, in response to the selection of at least one target object external to the first device, decode the audio packets, received from the second device to generate an audio signal, and output the audio signal based on the selection of the at least one target object external to the first device. The first device may also include a memory, coupled to the one or more processors, configured to store the audio packets.

In one example, the disclosure describes a method that includes initiating communication with a second device, the method includes detecting a selection of at least one target object external to the first device, initiating a channel of communication between the first device and a second device associated with the at least one target object external to the first device, receiving audio packets, from the second device, in response to the selection of at least one target object external to the device. The method also includes decoding the audio packets, received from the second device, to generate an audio signal, and outputting the audio signal based on the selection of the at least one target object external to the first device.

In one example, the disclosure describes an apparatus that includes means for detecting a selection of at least one target object external to the first device, and means for initiating a channel of communication between the first device and a second device associated with the at least one target object external to the first device. The apparatus also includes means for receiving audio packets, from the second device, in response to the selection of at least one target object external to the device. The apparatus may also include means for decoding the audio packets, received from the second device, to generate an audio signal, and means for outputting the audio signal based on the selection of the at least one target object external to the first device.

In one example, the disclosure describes an apparatus that includes means for means for detecting a selection of at least one target object external to the first device, and means for initiating a channel of communication between the first device and a second device associated with the at least one target object external to the first device. The apparatus also includes means for receiving audio packets, from the second device, in response to the selection of at least one target object external to the device. The apparatus may also include means for decoding the audio packets, received from the second device, to generate an audio signal, and means for outputting the audio signal based on the selection of the at least one target object external to the first device.

In one example, the disclosure describes a non-transitory computer-readable medium storing computer-executable code, the code executable by one or more processors to detect a selection of at least one target object external to the first device, and initiate a channel of communication between the first device and a second device associated with the at least one target object external to the first device. The code when executed may cause the one or more processors to receive audio packets, from the second device, in response to the selection of at least one target object external to the device, decode the audio packets, received from the second device, to generate an audio signal. The code when executed may cause the one or more processors to output the audio signal based on the selection of the at least one target object external to the first device.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
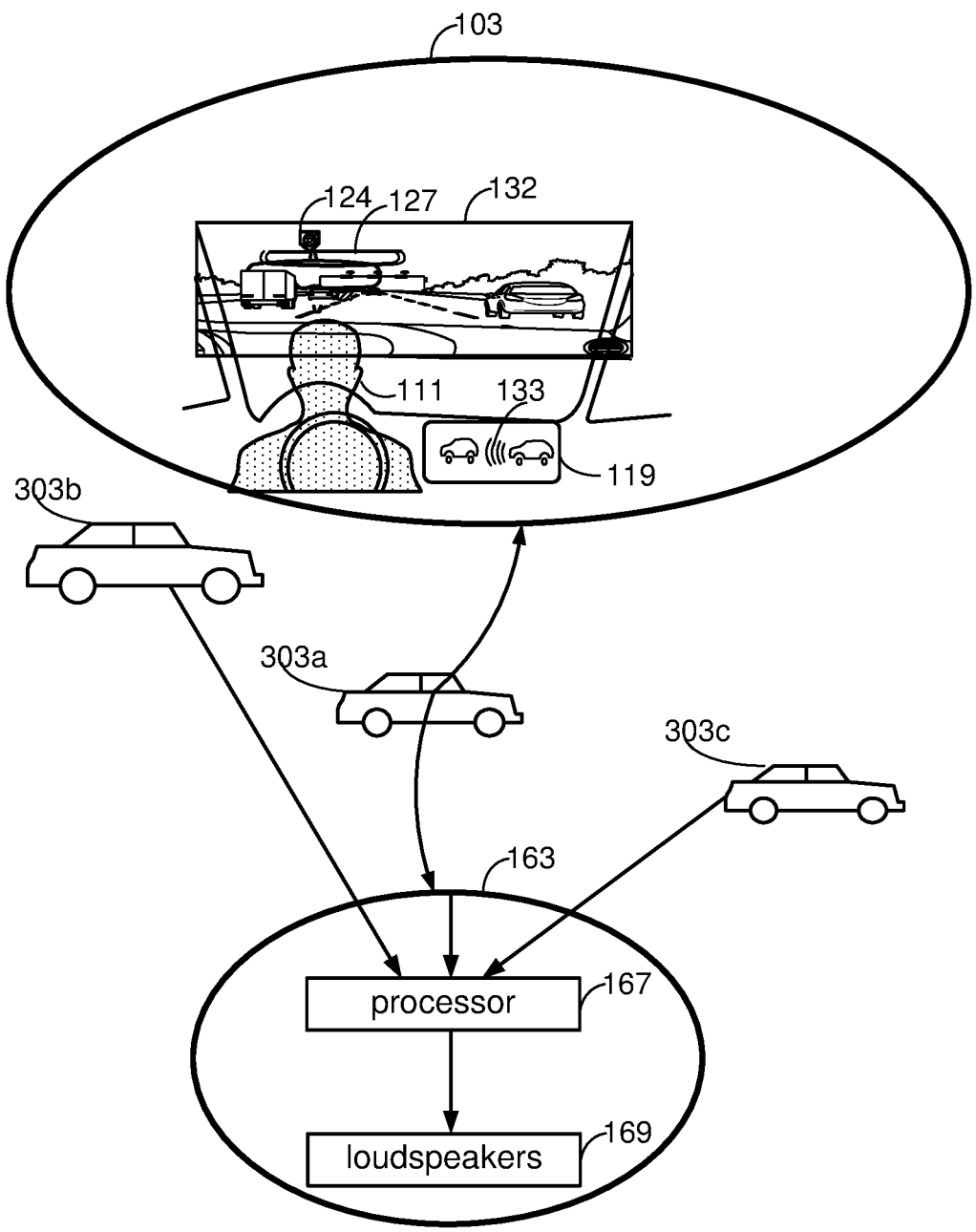
FIG. 1a illustrates a conceptual diagram of a first device in communication with another device (e.g., a second device) based on detection of a selection of the other device.

Certain wireless communication systems may be used to communicate data that is associated with high reliability and low latency. One non-limiting example of such data includes C-V2X and V2X communications. For example, self-driving cars may rely on wireless communications. Self-driving cars may include some sensors, e.g., Light Detection and Ranging (LIDAR), RAdio Detection And Ranging (RADAR), cameras etc., that are line of sight sensors. C-V2X and V2X communication, however, may include line of sight and non-line of sight wireless communications. Currently C-V2X and V2X communications are examples of using of non-line of sight wireless communications for handling the communication between vehicles approaching a common intersection but not within sight of one another. C-V2X and V2X communication can be used to share sensor information between the vehicles. This and other communication scenarios raise certain considerations. For example, for a particular location or geographical area there may be several vehicles sensing the same information such as an obstacle or a pedestrian. This raises the question of which vehicle should broadcast such information (e.g., sensor data), how such information is shared (e.g., which channel configuration provides reduced latency and improved reliability), and the like.

A C-V2X communication system may have logical channels and transport channels. The logical channels and transport channels may be used as part of uplink and downlink data transfers between a first device (e.g., a headset or vehicle) and a base station or another intermedia node in the network. A person having ordinary skill in the art may recognize that the logical channels may include different types of control channels, e.g., xBCCH, xCCH, xDCCH. The xBCCH type channel may be used when the first device is downloading broadcast system control information from another entity (e.g., a server, or a base station). The xCCCH control channel may be used to transmit control information between the first device (e.g., a vehicle, mobile device, or headset) and the network (e.g., a node in the network base station). The xCCCH control channel may be used when the first device (e.g., a vehicle, mobile device, or headset) does not have a radio resource control connection with the network. The xDCCH control channel includes control information between the first device and a network, and is used by the first device having a radio resource control connection with the network. The xDCCH is also bi-directional, i.e., control information may be transmitted and received by the first device and the network.

Generally, some information bits conveyed in the different types of control channels mentioned above may provide an indication of the location of the data channels (or resources). Since data may span several sub-carriers (depending upon the amount of transmitted data) and the control channels are currently fixed in size, this may introduce transients or gaps in time/frequency between the control channel and the corresponding data channel. This results in unused frequency/time resources of the control channels. It may be possible to leverage the unused frequency/time resources for other purposes for communicating media between vehicles or between devices. It may also be possible to create new channels in a V2X or C-V2X system, specifically, for the exchange of media between vehicles or between devices.

As noted above, vehicles are using many advancements from other fields to improve their safety, infotainment systems, and overall user experience.

For example, object detection algorithms that incorporate sensors such as RADAR, LIDAR, or computer vision may be used in a vehicle to perform object detection while driving. These objects may include lanes in the road, stop signs, other vehicles or pedestrians. Some of the V2X and C-V2X use cases envision cooperative V2X systems to alert the vehicle or driver of the vehicle when there may be a likely collision between the vehicle and another object (e.g., a car, bicycle or person). Because of the relatively nascent nature of the V2X and C-V2X systems, a number of refinements have yet to be envisioned.

One area for refinement is in communications between people while in different vehicles. Though it is possible to for someone in a vehicle to communicate with another person in a different vehicle, the communication is done by making a phone call. The initiator of the phone call knows what phone number to dial to communicate with the other person, then dials it.

This disclosure envisions refinements to the way that a device allows for communication or audible experience, with a someone else or some other device, based on initiating target object selection sent to the selected target object using a direct channel communication or peer to peer connection, V2X, or C-V2X communication system.

For example, a first device for communicating with a second device, may include one or more processors configured to detect a selection of at least one target object external to the first device, and initiate a channel of communication between the first device and a second device associated with the at least one target object external to the first device. Whether a selection of the at least one target object external to the first device, or the initiation of the channel of communication between the first device and the second device associated with the at least one target object external to the first device, is performed first, may not be material. It may depend on the context or situation, whether a channel is already established, and the initiation of the channel of communication takes place, or whether the initiation of the channel of communication is based off of the detection of the selection of the at least one target object external to the first device.

For example, the channel of communication between the first device and the second device may have already been established prior to the detection of the selection of at least one target object external to the device. It may also be possible that the initiation of the channel of the communication between the first device and the second device was in response to the detection of the selection.

In addition, the one or more processors in the first device may be configured to receive audio packets, from the second device, as a result of the channel of communication between the at least one target object external to the first device and the second device. Subsequently, after the audio packets are received, the one or more processors may be configured to decode the audio packets, received from the second device, to generate an audio signal, and output the audio signal based on the selection of the at least one target object external to the first device. It is possible that the first device and the second device may be a first vehicle and a second vehicle. This disclosure has different examples illustrating vehicle's, but many of the techniques described are also applicable to other devices. Namely, the two devices may be headsets including: mixed reality headsets, Head-Mounted-Display, Virtual Reality (VR) headsets, Augmented Reality (AR) headsets, or the like.

The audio signal may be reproduced by one or more loudspeakers coupled to the first device. If the first device is a vehicle, the loudspeakers may be in the cabin of the vehicle. If the first device is a headset, the loudspeakers may reproduce a binauralized version of the audio signal.

Based on the selection of the target object, communication, using a C-V2X or V2X system, or other communication system, between the one or more target objects and the first device may be performed. The second device, i.e., a headset or vehicle may have a person or persons speaking or playing music associated with the second device. The speech or music emanating from inside the second vehicle or emanating from the second headset may be compressed using an audio/speech codec and produce audio packets. An audio/speech codec may be two separate codecs, e.g., an audio codec, or may be a speech codec. Alternatively, one codec may have the ability to compress audio and speech.

Additional techniques and context are described herein with reference to the figures.

FIG. 1a illustrates a conceptual diagram of a first device that can be communicated with another device (e.g., a second device). The conceptual diagram also includes detection of a selection, within the first device, of the other device. For example, the first device may be a first vehicle 303a which is capable of communicating with second device through a V2X or C-V2X communication system. The first vehicle 303a may include different components or a person 111 as shown in the circle 103 above. The person 111 may be driving, or the person 111 may not be driving if the first vehicle 303a is self-driving. The person 111 may see other vehicles driving on the road, through the mirror 127, or the window 132, of the first vehicle 303a and wish to hear the type of music that is playing on the radio within another vehicle. In some configurations of the first vehicle 303a, a camera 124 of the first vehicle 303a may aid the person 111 to see other vehicles that may be challenging to see through the mirror 127 or the window 132.

The person 111 may select at least one target object that's external to the vehicle, or if the person 111 is wearing a headset, the at least one target object is external to the headset. The target object may be a vehicle itself, i.e., the second vehicle may be the target object. Alternatively, the target object may be another person. The selection may be a result of an image detection algorithm that may be coded in instructions that are executed by a processor in the first vehicle. The image detection algorithm may be aided by external camera's mounted on the first vehicle. The image detection algorithm may detect different types of vehicles or may just detect faces.

In addition, or alternatively, the person 111 may utter a descriptor to identify the target vehicle. For example, if the second vehicle is a black honda accord, the person may utter "the honda accord," "the black honda accord in front of me," "the accord to my left," etc., and a speech recognition algorithm that may be coded in instructions that are executed on a processor in the first vehicle to detect and/or recognize the phrase or keywords (e.g., the makes and models of cars). As such, the first device may include the selection of the at least one target object is based on detection of a command signal based on keyword detection.

The processor that executes the instructions for the image detection algorithm may not necessarily be the same processor that executes the instructions for the speech recognition algorithm. If the processors are not the same, the may work independently or work in a coordinated fashion, e.g., to aid the image or speech recognition of the other processor. One or more processors, which may include the same processor used in either the image detection or speech recognition, or a different processor may be configured to detect the selection of the at least on target object of the first device. That is to say, one or more processors may be used to detect which target object (e.g., face or other vehicle or headset) was selected. The selection may initiate a communication between the second device (the other vehicle or headset). In some instances, the channel of communication between the first device and second device may have already been established. In some instances, the image detection algorithm may also incorporate aspects of image recognition, e.g., detecting a vehicle vs. detecting a "honda accord." For simplicity, in this disclosure, image detection algorithms may include image recognition aspects, unless expressly stated otherwise.

As mentioned above, when two people wish to communicate with each other and speak, one person calls the other person by dialing a phone number. Alternatively, two devices may be wirelessly connected to each other, and each device may register the Internet Protocol (IP) address of the other device if both devices are connected to a communication network. In FIG. 1a, the communication between the first device and second device, may also be established through each of the devices respective IP address in a V2X, C-V2X communication network, or network with capabilities of connecting two devices directly, e.g., without the use of a base station. However, unlike instant messaging, chatting, or emailing, the communication between the first device and the second device is initiated based on a selection of the target object associated with the second device or based on the selection of the second device itself directly.

For example, the person 111 in the vehicle 303a may see a second vehicle 303b, or a different second vehicle 303c, and may wish to initiate communication with the person in one of those vehicles based on image detection, image recognition, or speech recognition of the vehicle.

After selection of the target object, the one or more processors in the first device may be configured to initiate communication including based on an IP address. In the case where the person 111 is a driver of the first vehicle, it is unsafe to initiate messaging, email, or chatting through a dialogue window with the use of one's hands. However, audio user interfaces to speak without the use of hands are increasingly becoming more popular, and in the system illustrated in FIG. 1a it may be possible to initiate communication between two devices and speak to another person based on a V2X or C-V2X communication system. Vehicles may communicate using V2V communications or a sidelink channel using C-V2X. An advantage of C-V2X systems is that vehicles may send communication signals between vehicles independent of whether the vehicle is connected to a cellular network or not.

It may also be possible for vehicles to communicate using V2V communications or a sidelink channel when the vehicles are wirelessly connected to a cellular network.

It may possible to include other data in the sidelink channel. For example, audio packets, and/or one or more tags of audio content may be received via the sidelink channel. In the case, where the person 111 is not driving, either because the vehicle is driving itself, or because the person 111 is a passenger, it may be possible to also to send instant messages between devices in the sidelink channel. The instant messages may be part of a media exchange, which may include audio packets, between a first device and a second device.

Also illustrated in the top circle 103 is a display device 119. The display device 119 may represent images or icons of vehicles. When the communication is initiated or during the communication between the first vehicle 303a and a second vehicle, e.g. 303b or 303c, a pattern 133 may light up or may blink on and off.

Moreover, after selection of the target object, audio packets may be received from the second device as a result of the channel of communication between the at least one target object external to the first device and the second device. For example, the circle 163 below includes a processor 167 which may be configured to decode the audio packets, received from the second device, to generate an audio signal, and output the audio signal based on the selection of the at least one target object external to the first device. That is to say, one may be able to hear, through playback of the loudspeakers 169 what speech or music is playing in the second vehicle (or headset device).

As explained later in this disclosure, other modes of selection may be possible, including gesture detection of person 111, and eye gaze detection of person 111.

Figure 1B:
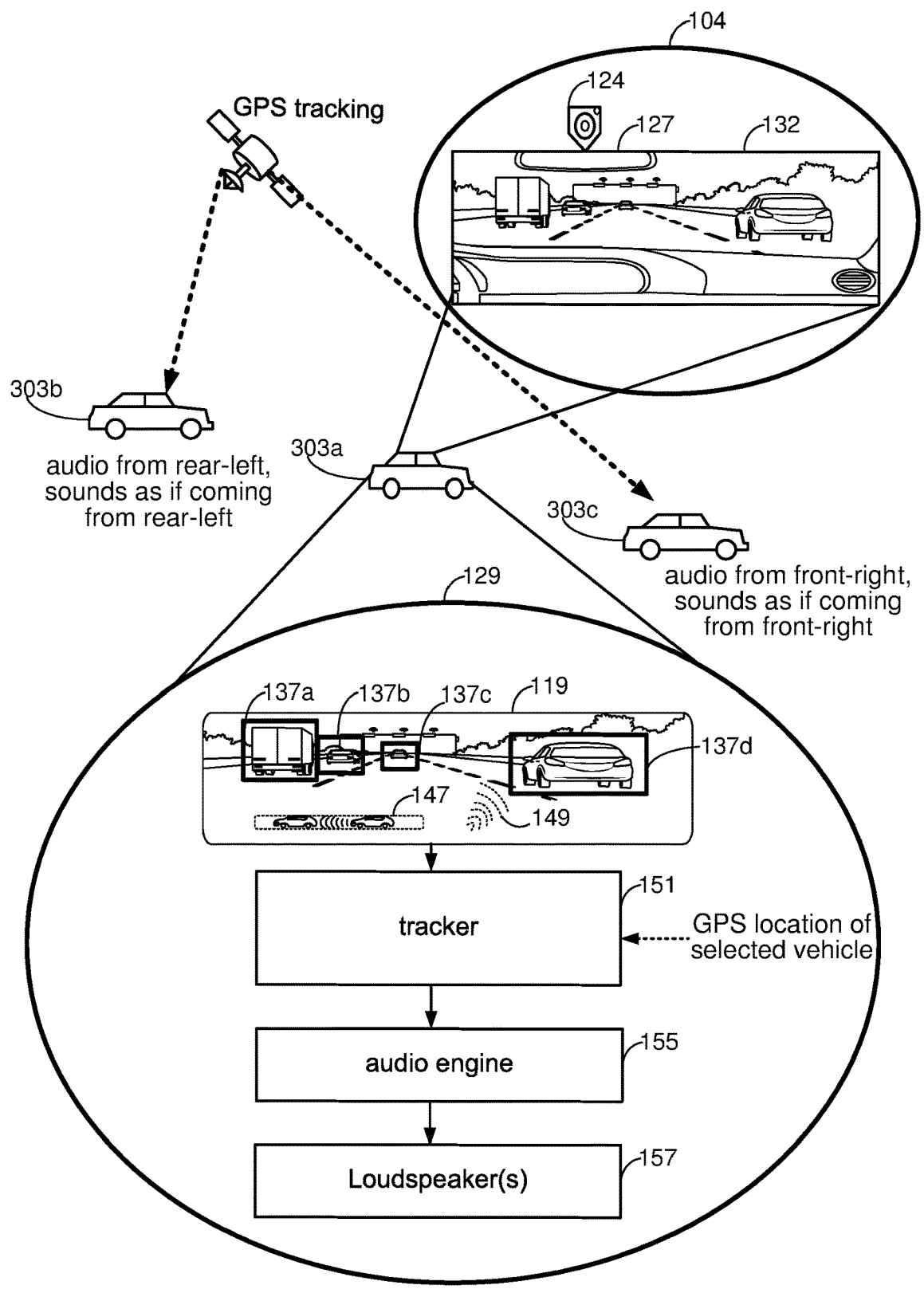
FIG. 1b illustrates a conceptual diagram of a first device that can be communicated with another device (e.g., a second device) based on detection of a selection of the other device and aided by a tracker, where the audio communication may be spatialized.

FIG. 1b illustrates a conceptual diagram of a first device that can be communicated with another device (e.g., a second device). The conceptual diagram also includes detection of a selection, within the first device, of the other device, aided by a tracker, and the audio communication may be spatialized.

FIG. 1b has a similar to the description associated with FIG. 1a, with the addition of other elements. For example, the top circle 104 does not illustrate the device 119 as it is illustrated in the lower circle 129. The top circle 104 illustrates vehicles outside of a window 132, the mirror 127 and the internal camera 124 which function as described with respect to FIG. 1a.

The lower circle 129 illustrates the display device 119. In addition to just representing icons, or images of a vehicle 133, the display device may represent images of the actual vehicles that may be potential selections by a person 111 in the first vehicle 303a. For example, images of vehicles captured by one or more external cameras (e.g. 310b in FIG. 3, 402 in FIG. 4) are represented on display device 119. The images of the vehicles may have bounding boxes 137a-137d encapsulating each of the images of the vehicles. The bounding boxes may help in the selection of the target object, e.g., one of the vehicles represented on the display device. In addition, instead of the pattern 133 between the icons and images of a vehicle, there may be a separate pattern 149 from the perspective of the person 111 who selected the second vehicle. Thus, bounding box 137d may illustrate a second vehicle 303b selected, and the direction of the separate pattern 149 may be lit or may also blink on and off to denote that communication has been initiated or is taking place with the second vehicle 303b.

In addition, a processor may include a tracker 151, and a feature extractor (not shown) that may perform feature extraction on images on the display device 119. The extracted features alone, or in some configurations in conjunction with the RADAR/LIDAR sensor(s), may aid in the estimate of the relative position of the vehicle selected, e.g. 303*b*. In other configurations, the tracker 151 may be aided or operate solely on the input from GPS location of the selected vehicle that may also be transmitted to the first vehicle 303*a* through a channel of communication in a V2X or C-V2X system.

For example, a second vehicle 303*b*, or another second vehicle 303*c* may not be visible with a camera. In such a scenario, the vehicles, vehicle 303*b* and 303*c*, may each have a GPS receiver that detects the location of each vehicle. The location of each vehicle may be received by the first device, e.g., vehicle 303*a*, via assisted GPS or if the V2X or C-V2X system allows it, directly through the V2X or C-V2X system. The reception of the location of the vehicle may be represented by GPS coordinates, as determined by one or more GPS satellites 160 alone, or in conjunction with a base station (as used in assisted GPS for example). The first device may calculate its own position relative to the other vehicles, vehicle 303*b* and 303*c*, based on knowing the first device (its own) GPS coordinates via its own GPS receiver. In addition to, or alternatively, the first device may calculate its own position based on the user of RADAR sensors, LIDAR sensors, or cameras coupled to the first device. It is understood that a calculation may also be referred to as an estimation. Thus, the first device may estimate its own position based on RADAR sensors, LIDAR sensors, cameras coupled to the first device, or receiving GPS coordinates. In addition, each vehicle or device may know its own position by using assisted GPS, i.e., having a base station or other intermediary structure receive GPS coordinates and relay them to each vehicle or device.

Moreover, the display device 119 may represent an image of the second device in a relative position of the first device. That is to say, the external facing camera(s) 310*b*, or 402 in coordination with the display device 119 may represent the second device in a relative position of the first device. Thus, the display device 119 may be configured to represent the relative position of the second device. In addition, the relative position of the second device may represented as an image of the second device on the display device 119.

In addition, the audio engine 155 which may be integrated to the one or more processors may process the decoded audio packets based on the relative position of the device. The audio engine 155 may be part of an audio spatializer which may be integrated as part of the processor, may output the audio signal as a three-dimensional spatialized audio signal based on a relative position of the second device as represented on the display device 119.

As discussed above, the relative position may also be based on a GPS receiver, which may be coupled to the tracker 155 and may be integrated with the one or more processors, and the first device may perform assisted GPS to determine the relative position of the second device. The audio engine 155 which may be part of an audio spatializer which may be integrated as part of the processor, may output the audio signal as a three-dimensional spatialized audio signal based on a relative position determined by assisted GPS of the second device 161.

Moreover, in some configurations, the external facing cameras 310*b* and 402 may capture devices or vehicles that are in front or behind the first vehicle 303*a*. In such scenarios, it may be desirable to hear the sounds emanating from the vehicles or devices that are behind the first vehicle 303*a* (or if a headset, behind the person wearing a headset) with a different spatial resolution than those that are in front of the first vehicle 303*a*. Hence, the output of the three-dimensional spatialized audio signal at a different spatial resolution when the second device is at a first location (e.g., in front of the first device) relative to the first device, as compared to a second location (e.g., behind the first device) relative to the second device.

In addition, as the relative position of the at least one target object (e.g., a second device or second vehicle) external to the first device, is being tracked, the one or more processors may be configured to receive an updated estimate of the relative position of the at least one target object that is external to the first device. Based on the updated estimate, the three-dimensional spatialized audio signal may be output. Thus, the first device may render the three-dimensional spatialized audio signal through the loudspeakers 157. A person in the first vehicle 303*a* or wearing a headset may hear sounds received by a second device, for example, the vehicle 303*c* that is in the front right of the first device, as if the audio is coming from the front-right. If the first device is a vehicle 303*a*, the front right is with respect a potential driver of the vehicle 303*a* looking outwards out of the window 132 as if he or she were driving the vehicle 303*a*. If the first device is a headset, the front right is with respect to a person wearing a headset looking straight ahead.

In some scenarios, it may be possible for the audio engine 155 to receive multiple audio streams, i.e., audio/speech packets from multiple devices or vehicles. That is to say, that there may be multiple target objects that are selected. The multiple target objects external to the first device may be vehicles, headsets, or a combination of headsets and vehicles. In such scenarios where there are multiple target objects, the loudspeakers 157 may be configured to render the three-dimensional spatialized audio signal based on the relative position of each of the multiple vehicles (e.g., 303*b* and 303*c*) or devices (e.g. headsets). It is also possible that the audio streams may be mixed into one auditory channel and be heard together, as if there is a multi-party conversation between at least one person in the secondary vehicles (e.g. 303*b* and 303*c*).

In some configurations, the audio/speech packets may be received in a separate communication channel from each of the multiple vehicles. That is to say, the first vehicle 303*a* may receive audio/speech packets from a secondary vehicle 303*b* in one communication channel, and also receive audio/speech packets from a different secondary vehicle 303*c* in a different communication channel 303*c*. The audio packets (for simplicity) may represent speech spoken by at least one person in each vehicle of the secondary vehicles.

In such scenarios, the passenger in the first vehicle 303*a* or headset, may select two target objects by the techniques addressed throughout other parts of this disclosure. For example, the person 111 in the first vehicle 303*a* may tap in the area on a display device 119 encapsulated by the bounding boxes 137*a*-137*d*, to select at least two vehicles (e.g. 303*b* and 303*c*) by which to have a multi-party communication with. Alternatively, the person 111 may use speech recognition to select at least two vehicles (e.g. 303*b* and 303*c*) by which to have a multi-party communication with.

In some configurations, the one or more processors may be configured to authenticate each of the person or vehicles of the secondary vehicles, to facilitate a trusted multi-party conversation between at least one person in a secondary vehicle (e.g. 303*b* and 303*c*) and a person 111 in the first vehicle 303*a*. Authentication may be based on speech recognition, if the people are comfortable storing samples of each others' voice in their vehicles. Other authentication methods may be possible involving face or image recognition of the persons or vehicles in the multi-party conversation.

Figure 1C:
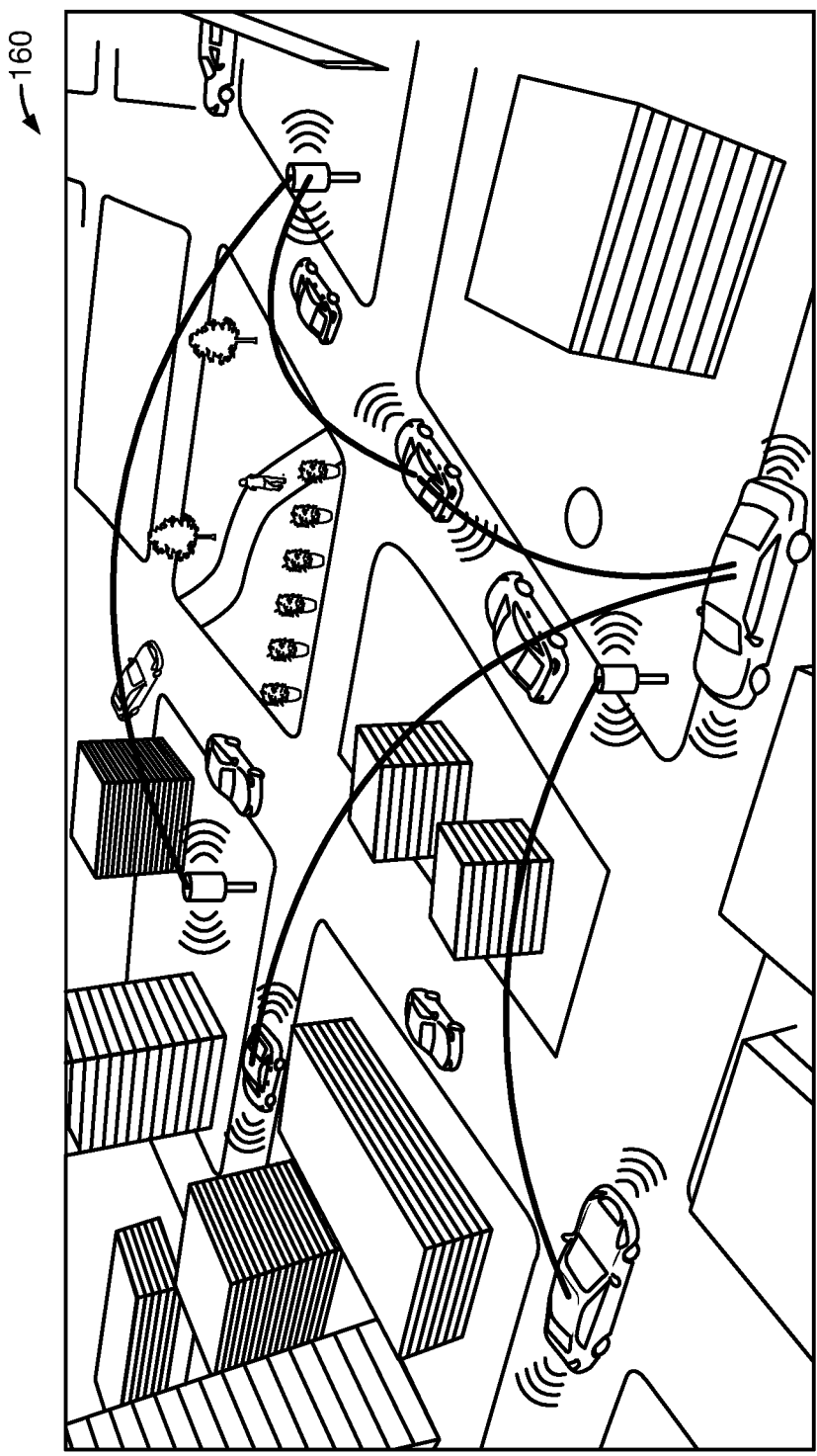
FIG. 1c illustrates a conceptual diagram of a different vehicles transmitting and receiving wireless connections according to the techniques described in this disclosure.

FIG. 1c illustrates a conceptual diagram of a different vehicles transmitting and receiving wireless connections according to the techniques described in this disclosure.

Vehicles may directly be wirelessly connected as illustrated in FIG. 1c, or may be wirelessly connected to different access points or nodes that are capable of sending and receiving data and/or messages as part of a C-V2V or V2X communication system 176.

Figure 1D:
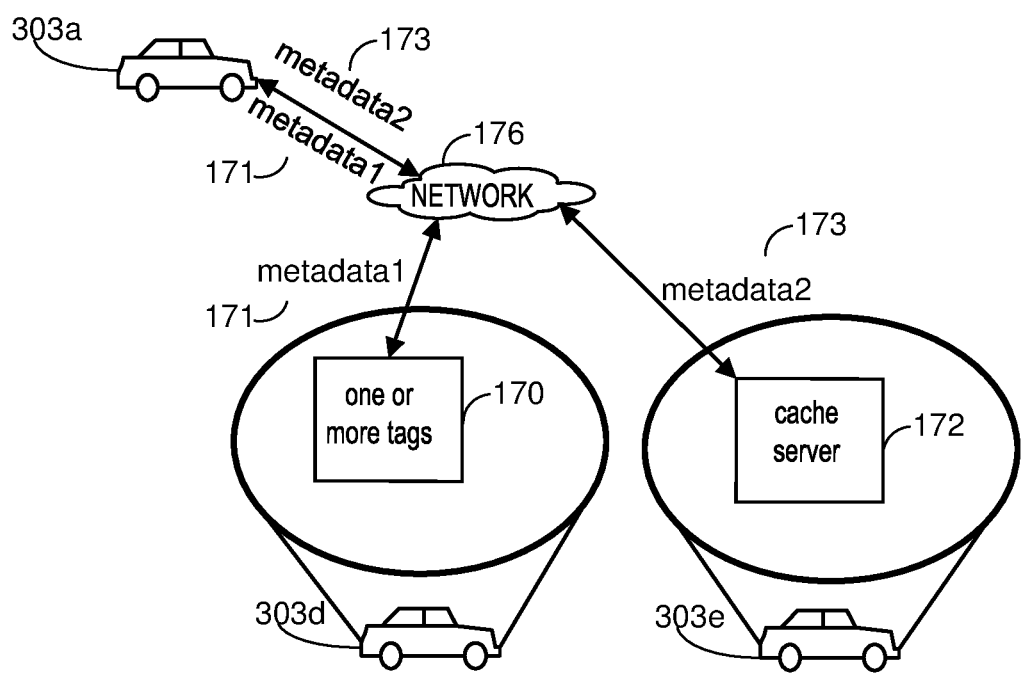
FIG. 1d illustrates a conceptual diagram of different vehicles transmitting and receiving wireless connections using a cache server within a vehicle, or a memory within a vehicle.

FIG. 1d illustrates a conceptual diagram of different vehicles transmitting and receiving wireless connections using a cache server within a vehicle, or a memory within a vehicle.

Instant messages that are exchanged between a first device and a second device that are wirelessly connected via a sidelink channel, may include data packets and/or audio packets, that delivered from one vehicle to another. For example, a second device (e.g. vehicle 303d) may broadcast or send an instant message over a sidelink channel, where the instant message includes metadata1. In some configurations, the metadata1 is sent over the sidelink, and may not necessarily be part of an instant message.

In a different embodiment, vehicles in a C-V2X or V2X communication system 176 may receive instant messages or metadata including one or more tangs associated with audio content from a static broadcast station to vehicles (e.g., vehicle 303a, 303d, 303e) delivered via a content delivery network (CDN). A CDN may transfer data efficiently and quickly between sender and receiver. In distributed network there are many possible combinations of network links and routers forwarding the packets that may be used. The selection of network links and routers provides for fast and reliable content delivery networks.

Content which is in high demand may be stored or cached in memory locations that are close to the edge of the network, where the consumer of the data is located. This may be more likely when there is media content being broadcast such as an entertainment with many viewers and listeners. A closer physical location of the cache to the consumer of the media may imply a faster network connection and better content delivery. In a configuration scenario where the senders and receivers of the data are both traveling in vehicles, and the vehicles change positions relative to each other, the role of a CDN may provide an efficient way to deliver media content over a sidelink channel. The content cached at the edge of the network closest to the consumer may be stored in device (e.g. vehicle 303d) that is traveling. The media content (e.g., audio content or one or more tags of metadata) is being transmitted to other traveling vehicles. If traveling along a road in the same direction, the broadcaster device (e.g., vehicle 303e) and listener device (e.g., vehicle 303a) are only within a few miles of each other. Therefore, a strong local connection is likely. Conversely, if the two vehicles are traveling along opposite directions on the same road, it may be possible for the listener vehicle 303a to fall out of range from the broadcaster device (e.g., vehicle 303e) and listener device (e.g., vehicle 303a).

In a vehicle to vehicle communication system, it may be possible receive radio stations that are out of range of a vehicle. For instance, a vehicle traveling 300 miles between cities will undoubtedly lose the signal from the departure city. However, with CDNs, it may be possible that the radio signal be relayed and re-broadcast from vehicles at the range limit of the radio station signal. The vehicles at a certain radial distance from the broadcast station become the cache for the radio station, allowing other vehicles with a certain range to request a stream. That is to say, it may be possible for a broadcast vehicle 303e to include a cache server 172, and broadcast metadata2 over a C-V2X or V2X communication system network 176. A listener vehicle 303a may receive the metadata2.

Machine learning algorithms may be used to listen to, parse, understand, and broadcast the listening preferences of a driver. Combined with geographic location of the driver, information may be gathered to determine the most popular content received by vehicles the most frequently from other vehicles within each geographic region.

As can be seen in FIG. 1d, there may be a first device for receiving metadata, from a second device. The first and second device may be wirelessly connected via sidelink channel that is part of a C-V2X or V2x communication system network 172. Once the first device (e.g., vehicle 303d) receives the metadata (e.g., metadata1 171 or metadata2 173), the first device may read the metadata and extract one or more tags representative of audio content.

The one or more tags may include song name, artist name, album name, writer, or an international standard recording code. The international standard recording code (ISRC) uniquely identifies sound recordings and music video recordings, and is codified as an ISO 3901 standard.

Metadata may be indexed and may be searchable my search engines. If the audio content is streamed or broadcast by a second device (e.g. vehicle 303d or 303e), the one or more tags may be read by an audio player, or in some cases by a radio interface to a radio. In addition, one or more of the audio tags may be represented on a display device. Metadata associated with audio content may include a song, an audio book, a track from a movie, etc.

Metadata may be structural or descriptive. Structural metadata represents data as containers of data. Descriptive metadata describes the audio content, or some attribute associated with the audio content (e.g., a song, the author, date of creation, album, etc.).

After the one or more tags representative of the audio content is extracted by one or more processors, the audio content may be identified based on the one or more tags extracted. The one or more processors of the first device may be configured to output the audio content.

In FIG. 1d, it may be also possible for the first device to be part of a group of devices that are configured to receive one of the one or more tags. A device (e.g., vehicle 303a) may be part of a group of devices (e.g., also vehicles 303b and 303c) which are configured to receive at least one tag of the metadata from another device (e.g., vehicle 303d or 303e). The group of devices, which may also include the other devices transmitting the metadata (e.g., vehicles 303d and 303e). That is there may be a group of devices that includes five devices, including where the devices are all vehicles (e.g., vehicles 303a, 303b, 303c, 303d and 303e), or there is a mixture of vehicles and headsets. It may be that the group of devices that includes the five devices.

In an embodiment, the group of devices may be part of a content delivery network (CDN). In addition, or alternatively, the second device (e.g., 303e) in the group of devices may be an individual content delivery network, and transmits the one or more tags to the rest of the devices in the group.

Figure 2:
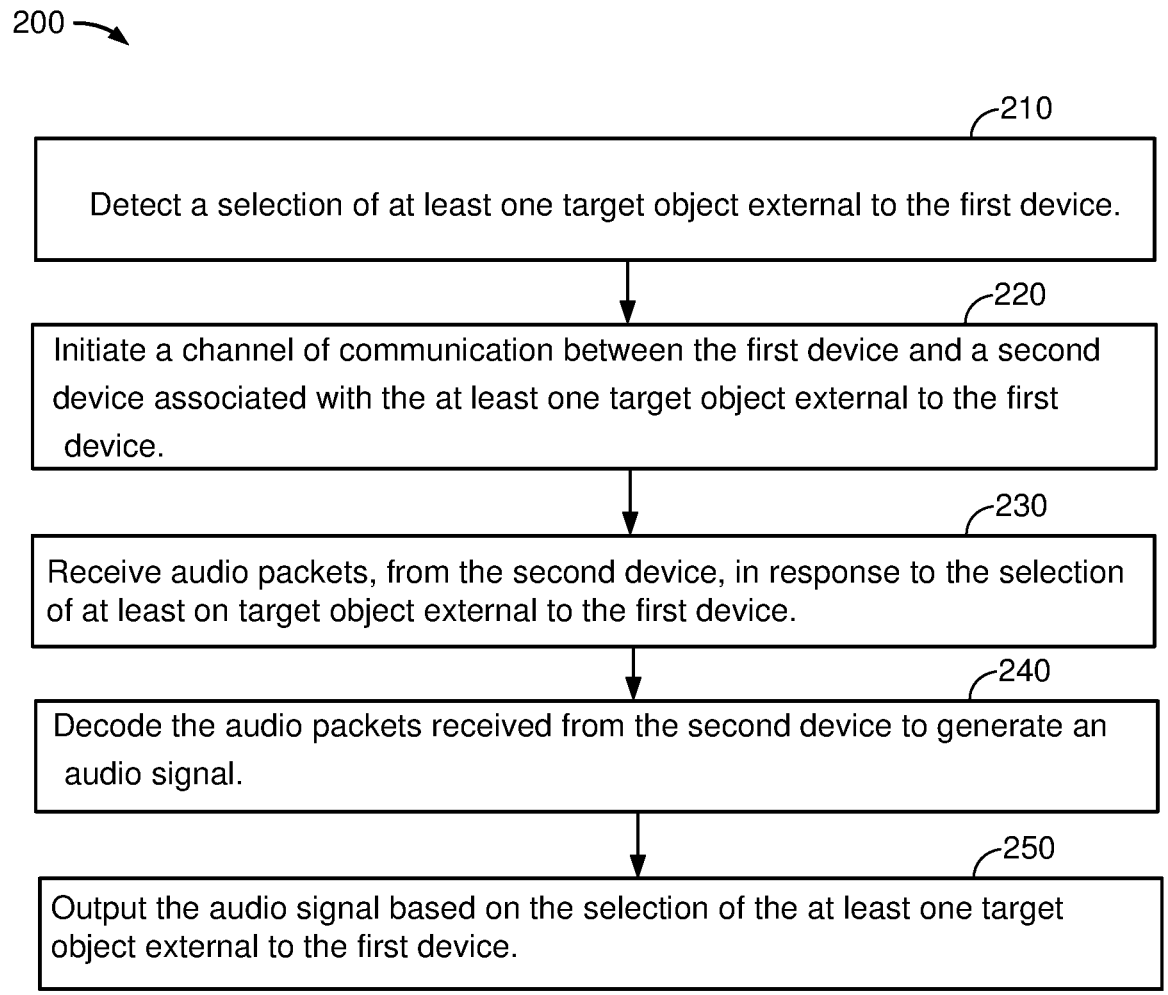
FIG. 2 illustrates a flowchart of a process of a first device initiating communication with a second device based on the techniques described in this disclosure.

FIG. 2 illustrates a flowchart of a process 200 of a first device initiating communication with a second device based on the techniques described in this disclosure.

A first device may include one or more processors configured to detect a selection of at least one target object external to the first device 210. The one or more processors may be configured to initiate a channel of communication between the first device and a second device associated with the at least one target object external to the first device 220. The one or more processors may be configured to receive audio packets, from the second device, in response to the selection of at least on target object external to the device 230.

The one or more processors may be configured to decode the audio packets, received from the second device, to generate an audio signal 240. The one or more processors may be configured to output the audio signal based on the selection of the at least one target object external to the first device 250.

Figure 3:
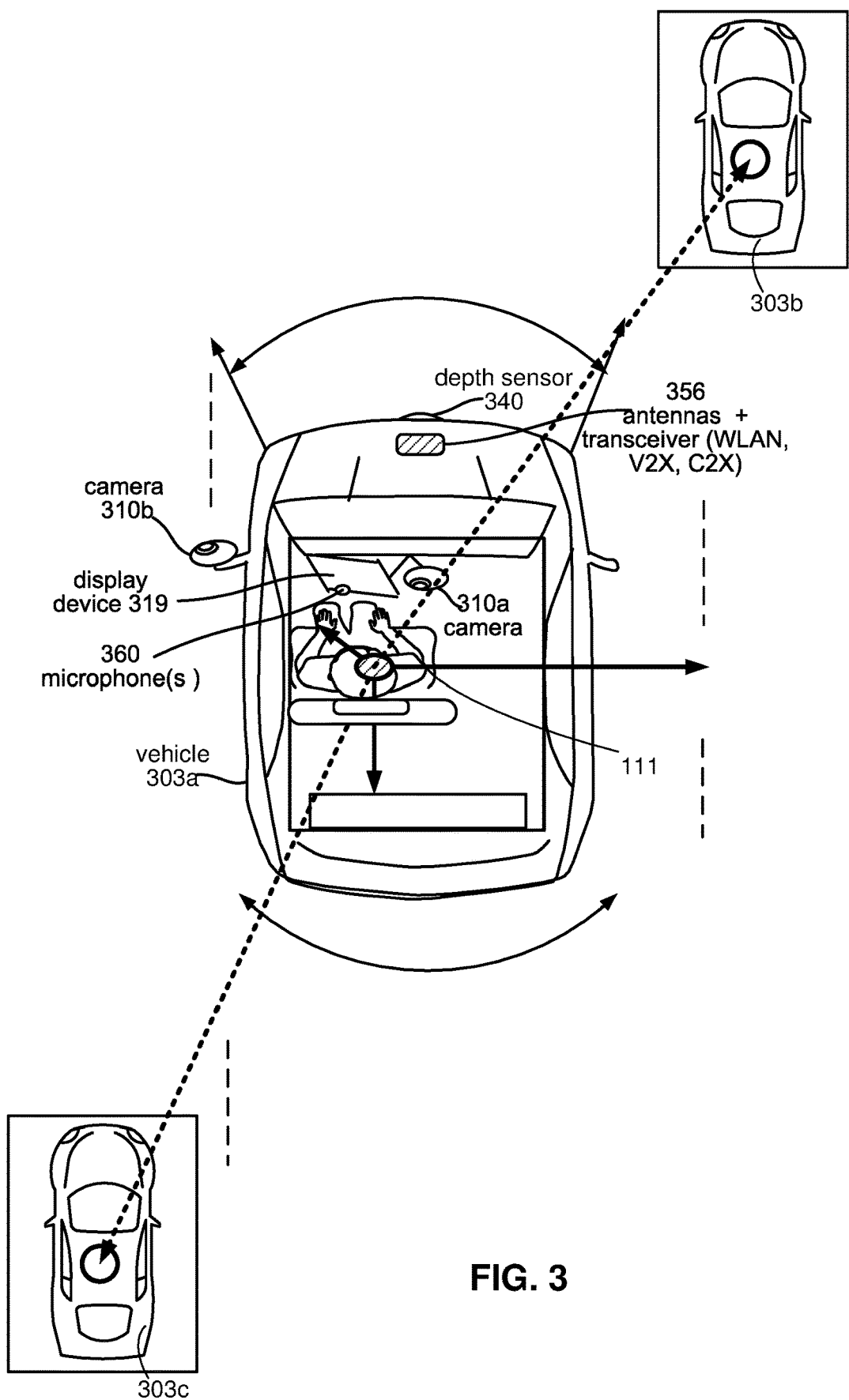
FIG. 3 illustrates a conceptual diagram of a first vehicle with different components on or in the first vehicle that operate according to the techniques described in this disclosure.

FIG. 3 illustrates a conceptual diagram of a first vehicle with different components on or in the first vehicle that operate according to the techniques described in this disclosure. As illustrated in FIG. 3, a person 111 may be moving in a vehicle 303*a*. A selection of a target object external to the vehicle 303*a* may be within the view of the driver directly which may be captured by an eye gaze tracker (i.e., the person 111 is looking at the target object) or gesture detector (the person 111 makes a gesture, e.g., points to the target object) coupled to camera 310*a* within the vehicle 303*a*. As such, The first device may include the selection of the at least one target object that is based on detection of a command signal based on eye gaze detection.

The camera 310*b* mounted on the vehicle 303*a* may also aid in the selection of the target object itself (e.g., the vehicle 303*b*) or another device associated with a target object, if the target object is a person external to the vehicle 303*a*, or there is some other recognizable image associated with the vehicle 303*b*.

Through either a wireless local area network (WLAN), which could be part of a cellular network such as C-V2X or the co-existence of a cellular network and a Wi-Fi network, or solely a Wi-Fi network, or a V2X network, the one or more antennas 356, optionally coupled with a depth sensor 340, may aid in the determination the relative location of where the target object is relative to the vehicle 303*a*.

It should be noted that, through one or more antennas 356 the camera 310*a* mounted within the vehicle 303*a*, or the camera 310*b* mounted on the vehicle 303*a*, or both cameras 310*a*, 310*b*, depending on the bandwidth available, may form a personal area network (PAN) that is part of the vehicle 303*a*. Through the PAN it may be possible for either camera 310*a* in the vehicle 303*a*, or a camera 310*b* on the vehicle 303*a* to be have an indirect wireless connection with device associated with the target object or the target object itself. Though the external camera 310*b* is illustrated near the front of the vehicle 303*a*, it may be possible for the vehicle 303*a* to have one or more external camera(s) 310*b* mounted near the back or in the back of the vehicle 303*a*, as to see what devices or vehicles are behind the vehicle 303*a*. For example, the second device may be a vehicle 303*c*.

An external camera 310*b* may aid in the selection, or as explained previously and below, GPS may also assist in the location of where the second device, such as where is the second vehicle 303*c* located.

The relative location of the second device may be represented on the display device 319. The relative location of the second device may be based on receiving the location by one or more antennas 356. In another embodiment, a depth sensor 340, may be used to aid or determine the location of the second device. It may also be possible that other location detection technology (e.g. GPS) detecting the location of the second device, or, assisted GPS may be used to determine the relative location of the second device.

The representation of the relative location of the second device, may appear as a synthetic image, icon or other representation associated with the second device, such that a person in the vehicle 303*a* may make a selection of the second device through an eye gaze towards the representation on the display device 319, or gesture (pointing or touch) towards the representation on the display device 319.

The selection may also be through speech recognition and use one or more microphone(s) 360 located inside the vehicle 303*a*. As the second device is in communication with the vehicle 3030*a*, an audio signal may be received by the (first) vehicle 303*a*, by a transceiver mounted in or on the vehicle 303*a*, coupled to the one or more antennas 356.

A person having ordinary skill in the art, also would appreciate that as advances in autonomous vehicles continue, the driver of the vehicle 303*a* may not actually be conducting (i.e., "driving") the vehicle 303*a* manually. Rather, the vehicle 303*a* may for some portion of time be self-driving.

Figure 4A:
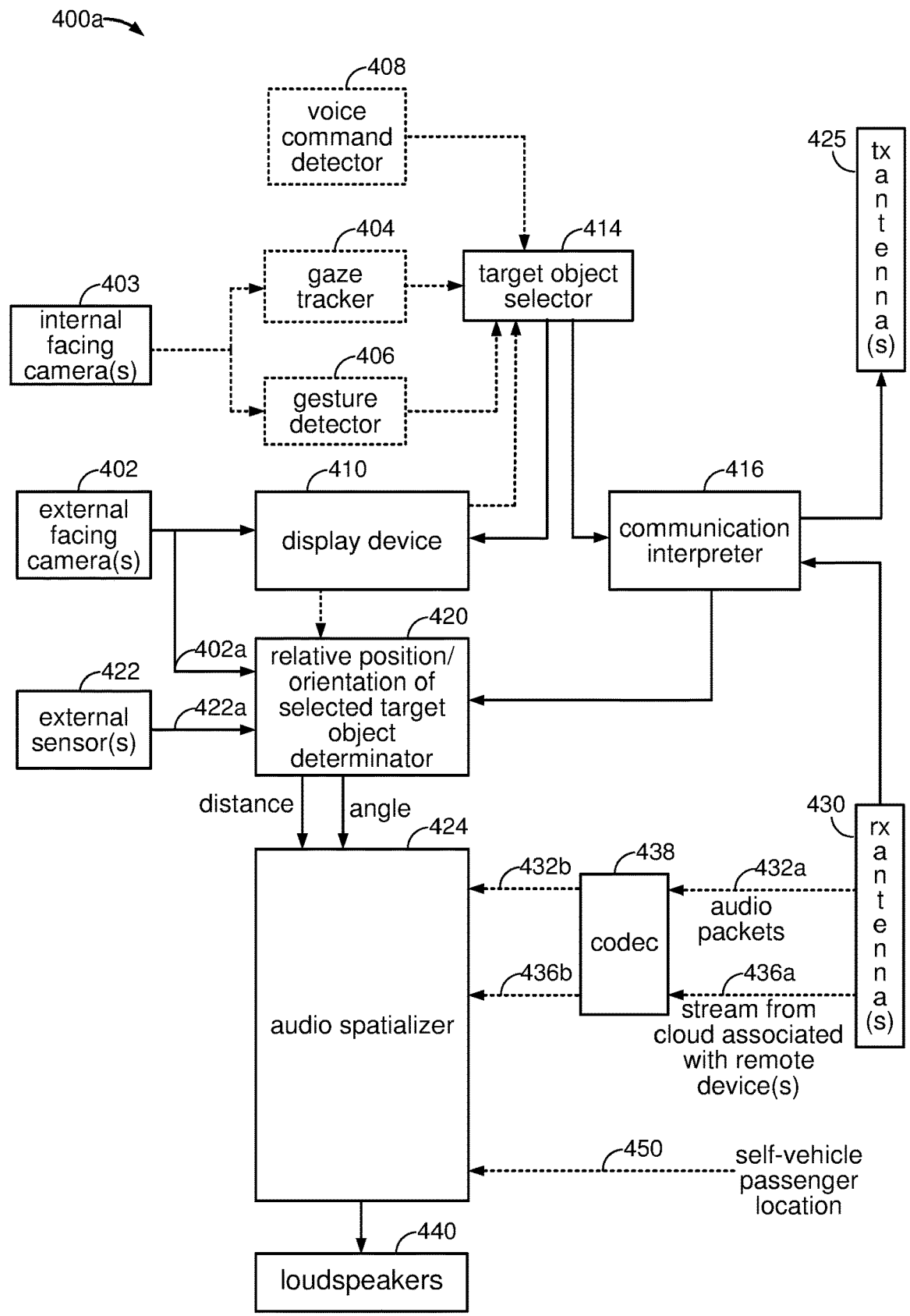
FIG. 4a illustrates a block diagram of a first device with different components on or in the first device that operate according to the techniques described in this disclosure.

FIG. 4*a* illustrates a block diagram 400*a* of a first device with different components on or in the first device that operate according to the techniques described in this disclosure. One or more of the different components may be integrated in one or more processors of the first device.

As illustrated in FIG. 4*a*, selection of a target object external to the first device may be based on an eye gaze tracker 404 which detects and tracks where a wearer of a headset is looking or where a person 111 in a first vehicle is looking. When the target object is within the view of the person, the eye gaze tracker 404 may detect and track the eye gaze and aid in selecting the target object via the target object selector 414. Similarly, a gesture detector 406 coupled to one or more internal facing camera(s) 403 within the vehicle 303*a*, or mounted on a headset (not shown), may detect a gesture, e.g., pointing in the direction of the target object. In addition, a voice command detector 408 may aid in selecting the target object based on the person 111 uttering phrases as described above, e.g. "the black Honda Accord in front of me." The output of the voice command detector 408 may be used by the target object selector 414 to select the intended second device, e.g. vehicle 303*b* or 303*c*.

As mentioned previously, it may be possible for the vehicle 303*a* to have one or more external facing camera(s) 402 mounted near the back or in the back of the vehicle 303*a*, as to see what devices or vehicles are behind the vehicle 303*a*. For example, the second device may be a vehicle 303*c*.

The target object, e.g. the second device, may be represented relative to the first device based on features of an image, the image, or both the image and features of the image, wherein the image captured by one or more cameras, coupled to the first device.

One or more external facing camera(s) 402 may aid in the selection of where the second vehicle 303*c* is located, e.g., in the back of the vehicle 303*a* (in other figures).

It is also possible that based on the one or more transmitter antennas 425 and possibly a depth sensor 340 (not shown in FIG. 4*a*), or other location detection technology (e.g. GPS) detecting the location of the second device, the relative location of the second device may be represented on the display device 410. The representation of the relative location of the second device, may appear as a synthetic image, icon or other representation associated with the second device, such that a person in the vehicle 303*a* may make a selection of the second device through an eye gaze towards the representation on the display device 410, or gesture (pointing or touch) towards the representation on the display device 410.

If the selection of the remote device, i.e., the second device is based on touch, the display device that includes the representation of the at least one target object to the external device (i.e., the first device) may be configured to select the at least one target object external to the device based on a capacitive sensor, or, ultrasound sensor on the display device changing state.

The first device's one or more transmitter antennas 425, coupled to the one or more processors included I the first device, may be configured to send communication data to the second device based on the initiation, by the one or more processors, of the channel of communication between the first device and the second device associated with the at least one target object external to the first device. That is, after selection of the second device, one or more processors may initiate a protocol or other form of communication between the first device and second device, in a channel of communication between the first and second device using the C-vVX and/or V-2X communications.

The selection may also be through speech recognition and use one or more microphone(s) (not shown in FIG. 4a) located inside the vehicle 303a. As the second device is in communication with the vehicle 3030a, an audio signal may be received by the (first) vehicle 303a, by one or more receiver antenna(s) 430 mounted in or on the vehicle 303a, coupled to a transceiver (e.g. a modem capable of V2X or C-V2X communications). That is to say, the one or more receive antenna(s) 430, coupled to the one or more processors, may be configured to receive the audio packets based on the result of the initiation of the channel of the communication between the at least one target object external (e.g., a second device) to the first device and the first device.

In addition, the first device may include one or more external facing camera(s) 402. The external facing camera(s) 402 may be mounted on the vehicle 303a may also aid in the selection of the target object itself (e.g., the vehicle 303b) or another device associated with a target object, if the target object is a person external to the vehicle 303a, or there is some other recognizable image associated with the vehicle 303b. The one or more external facing camera(s) may be coupled to the one or more processors which include a feature extractor (not shown) that may perform feature extraction on images on the display device 410. The extracted features alone, or in some configurations in conjunction with external sensor(s) 422 (e.g., the RADAR/LIDAR sensor(s)), may aid in the estimate of the relative position of the second device, (e.g., vehicle selected 303b).

The extracted features or the output of the external sensor(s) 422 may be input into a relative position/orientation of selected target object determinator 420. The relative position/orientation of selected target object determinator 420 may be integrated into one or more of the processors, and may be part of a tracker, or in other configurations (as illustrated in FIG. 4a) may be separately integrated into one or more processors. In FIG. 4a, the tracker 151 is not shown.

A distance and angle may be provided by the relative position/orientation of selected target object determinator 420. The distance and angle may be used by an audio spatializer 420 to output a three-dimensional audio signal that is based on a relative position of the second device. There may be at least two loudspeakers 440, coupled to the one or more processors that are configured to render the three-dimensional spatialized audio signal based on the relative position of the second device, or if there are multiple second devices, e.g., multiple vehicles, then the three-dimensional spatialized audio signal may be rendered as described above.

After a selection of the at least one target object external to the first device is performed by the target object selector 414, a command interpreter 416, integrated into one or more of the processors in the first device, a channel of communication between the first device and a second device associated with the at least one target object external to the first device. In response to the selection of at least one target object external to the first device audio packets may be received from a second device.

The audio packets 432a, from the second device, may be decoded, by the codec 438, to generate an audio signal. The audio signal may be output based on the selection of the at least one target object external to the first device. In some scenarios, the audio packets may represent a stream from cloud associated with remote devices (i.e., secondary devices) 436a. The codec 438 may decompress the audio packets and the audio spatializer may operate on uncompressed audio packets 432b or 432b. In other scenarios, the audio may be spatialized based on the passenger location of the person that made the selection of the secondary vehicle.

The transmission of audio packets by an audio codec to be used may include one or more of the following: MPEG-2/AAC Stereo, MPEG-4 BSAC Stereo, Real Audio, SBC Bluetooth, WMA and WMA 10 Pro. As C-v2X and v2V systems may use data traffic channels or voice channels, the audio packets (may carry speech signals) and in may use one or more of the following codecs to decompress the audio signals: AMR Narrowband Speech Codec (5.15 kbp), AMR Wideband Speech Codec (8.85 Kbps), G.729AB Speech Codec (8 kbps), GSM-EFR Speech Codec (12.2 kbps), GSM-FR Speech Codec (13 kbps), GSM-HR speech Codec (5.6 kpbs), EVRC-NB, EVRC-WB, Enhanced Voice Services (EVS). A speech codec is sometimes called a vocoder. Before being sent over the air, the vocoder packet is inserted into a larger packet. Voice is transmitted in voice-channels, although voice can also be transmitted in data channels using VOIP (voice-over-IP). The codec 438 may represent a speech codec, an audio codec, or a combination of the functionality to decode speech packets or audio packets. In general, for ease of explanation, the term audio packet also includes the definition of packets.

It is also possible that in one configuration that after the second vehicle is at a certain distance away from the first vehicle, the spatialization effect may be disabled.

The one or more processors included in the first device may be configured to disable a spatialization effect after the second vehicle is more than a configurable distance away from the first device. The certain distance may be configurable based on distance, e.g. an eighth of a mile. The configurable distance may be entered as a distance measurement or a time measurement. The certain distance may be configurable based on time, e.g., depending on the speed of the first and second vehicle. For example, instead of indicating that one eighth of a mile is the distance that the spatial effect should last, the distance between may be measured in terms of time. A vehicle traveling at 50 miles per hour (mph), one eighth of a mile is equivalent to 9 seconds, i.e., 125 mi/50 mi/hr=0.0025 hr=0.0025*60 min=0.15 min=9 seconds. Thus, after 9 seconds, in this example, the spatial effect may fade away or stop abruptly.

Figure 4B:
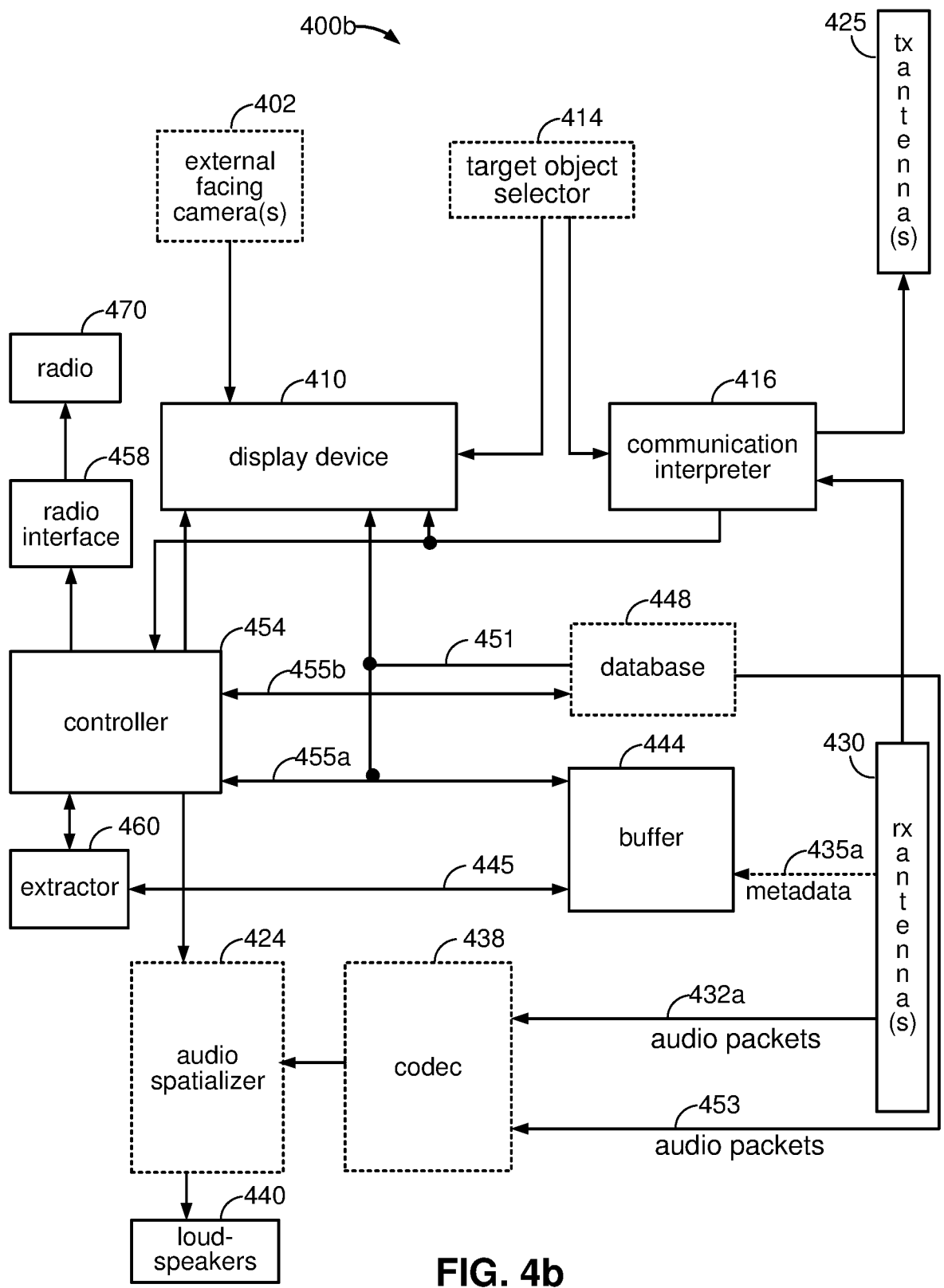
FIG. 4b illustrates a block diagram of a first device with different components on or in the first device that operate according to the techniques described in this disclosure.

FIG. 4b illustrates a block diagram 400b of a first device with different components on or in the first device that operate according to the techniques described in this disclosure. One or more of the different components may be integrated in one or more processors of the first device.

The block diagram 400b includes a communication interpreter 416, and rx antenna(s) 430. Through the rx antenna(s) 430, one or more processors may be configured to receive metadata 435, from a second device, wirelessly connected via a sidelink channel to the first device. The one or more processors may store the metadata in a buffer 444. From the buffer 444, the metadata 435 may be read. The one or more processors may be configured to extract one or more tags representative of audio content. For example, the communication interpreter 416 may send a control signal to the controller 454, and the controller which may be integrated as part of the one or more processors, may control the extractor 460, which may also be integrated as part of the one or more processors. The extractor 460, may be configured to extract one or more tags representative of audio content. The one or more tags may be written back via a bus 445 to the buffer 444, if they were not already in a form where they could be extracted in-situ in the buffer 444. That is to say, the extractor 460 may extract the one or more tags in the buffer 444, or the extractor 460 may receive metadata via a bus 445, and then write the one or more tags via the bus 445 back into a buffer 444. One of ordinary skill in the art would recognize that the location of where the one or more tags may be written may be a different memory location in the same buffer 444, or an alternate buffer. However, for ease of explanation may still be referred to as buffer 444.

The one or more processors may be configured to identify the audio content based on the one or more tags. The identification may be done in a number of ways. For example, one of the tags may identify the name of a song and the tag that identifies the song may be displayed on a display device 410, or the one or more processors may store the "song" tag in a memory location, e.g., also in the buffer 444, or an alternative memory location. Based on the identification the one or more processors may output the audio content.

The output of the audio content may be done in a number of ways. For example, one or more processors, in the first device, may be configured to switch to a radio station that is playing the identified audio content based on the one or more tags. This may occur by having a radio interface 458 receive a control signal from the controller 460. The radio interface 458, may be configured to scan through different radio stations on the radio 470, and switch the radio 470 to the radio station that is playing the identified audio content (e.g., a song) based on the one or more tags.

In another example, the one or more processors may be configured to start a media player and have the media player play the identified content based on one or more tags. The media player may read from a play list that has tags which may be associated with the one or more tags received. For example, the controller may be configured to compare the one ore more tags received via the metadata and extracted with its own tags to audio content stored in memory. The media player may be coupled to the database 448, and the database 448 may store the tags associated with the audio content of playlists of the media player. The database 448 may also store compressed versions of the audio content in the form of audio bitstreams, which includes audio packets. The audio packets 453 may be sent to a codec 438. The codec 438 may be integrated as part of the media player. One should observe that the audio packets 453 may be stored in the database 448. It may also be possible, to receive audio packets 432a as described in FIG. 4a. In addition, it may be possible to receive audio packets 432a associated with the one or more tags associated with the audio content received via the rx antenna(s) 430.

The first device, includes one or more processors, which may receive metadata, from a second device, wirelessly connected via a sidelink channel to the first device, read the metadata, received from the second device to extract one or more tags representative of audio content, and identify audio content based on the tag, then output the audio content.

The wireless link via the sidelink channel may be part of a C-2VX communication system. The first device and the second device in the C-V2Vx system may both be vehicles, or one of the devices (first or second) may be a headset, and the other a vehicle (first or second).

Similarly, the wireless link via the sidelink channel may be part of a V2X or V2V communication system. The first device and the second device in the V2V system may both be vehicles.

The first device may include one or more processors are configured to scan a buffer 444 based on a configuration preference stored on the first device. For example, there may be many sets of metadata received from multiple second devices. A person listening to audio content in a first device (whether a vehicle or headset) may only want to listen to audio content based on configuration preferences, e.g., rock music. The configuration preferences may also include attributes from the second device. For example, the second device may itself have tags to identify itself. For example, blue BMW. Thus, a person listening audio content in a first device may wish to listen to the content that came from a blue BMW.

In the same or alternative embodiment, the first device is coupled to a display device. The coupling may be an integration, for example, the display device is integrated as part of a headset or part of a vehicle. The one or more processors in the first device may be configured to represent one or more tags on a screen of the display device. As the buffer 444 is coupled to the display device 410, the one or more tags including song name, artist, and even blue BMW may appear on the screen of the display device 410. Thus, a person may see which songs came from the blue BMW.

As discussed previously with respect to FIG. 4a, the first device may include a display device that is configured to represent the relative position of the second device. Similarly, with respect to audio content identified based on the extracted one or more tags from the received metadata from a second device, the first device may include one or more processors that are configured to output of a three-dimensional spatialized audio content. The three-dimensional spatialized audio content may be optionally generated by the audio spatializer 424, after the audio packets 453 from the database 448 are decoded from the codec 438. In the same or alternative embodiment, the audio packets 432a associated with the one or more audio tags of the identified audio content may be decoded from the codec 438. The codec 438 may implement the audio codecs or speech codecs described with respect to FIG. 4a. The one or more processors may be configured to output of a three-dimensional spatialized audio content based on where the relative position of the second device is represented on the display device 410. The output three-dimensional spatialized audio content may be rendered by two or more loudspeakers 440 that is coupled to the first device.

In some configurations, independent of whether the position of the second device is represented on the display device 410, the output of the audio content may be a three-dimensional spatialized audio content that is based on the relative position of the second device.

In addition, in the same or alternate embodiment, the one or more processors may be configured to fade in or fade out audio content associated with the one or more tags.

The fade in or fade out of audio content associated with the one or more tags may be based on the configurable distance of the second device. For example, if the distance of the second device is within 20 meters or within 200 meters, the fade in or fade out of the audio content may be desirable by a person listening to the audio content in a first device. Moreover, as described in relation to FIG. 4a, the one or more processors may be configured to disable a spatialization effect after the second device is more than a configurable distance away from the first device. Thus, it may be that there is a first configurable distance to fade in and fade out audio content, e.g., within 0 to 200 meters, and a second configurable distance where the spatialization effect of a listener hearing a spatialization effect is disabled if the second device is within 200 meters or even further, e.g., up to 2000 meters. As described previously, the a configurable distance (either the first configurable distance or the second configurable distance) may be a distance measurement or a time measurement.

As described with respect to FIG. 1d, the first device may be part of a group of devices. The one or more tags 170 or cache server 172 illustrated in FIG. 1d may also be part of buffer 444, or may alternatively be drawn adjacent to buffer 444 in FIG. 4b, where the metadata 435a may be either metadata1 or metadata2, depending on whether the second device is a device that has the one more tags 170 in a memory (e.g., vehicle 303d), or whether the second device is a device that has the cache server 172 (e.g., vehicle 303e). Thus, it also may be possible for the fade in or fade out of audio content to be based on when one of the devices in the group disconnects from the group. For example, the first device may disconnect from the group of devices, and the audio content may fade out. Similarly, when connecting to be part of the group of devices, the audio content may fade in. In both the fade in and fade out of when a device (e.g. a first device) is connected or disconnected from a group of devices, the fade in or fade out may also be based on a configurable distance, and may be a distance measurement, or a time measurement.

In addition, the first device and the other devices in the group of devices may be part of a content delivery network (CDN), as described above when describing FIG. 1d.

The first device or second device may be an individual content delivery network, and may send one or more tags to the other devices of the group.

Though the external facing camera(s) 402 and target object selector 414 are drawn in FIG. 4b, without the other components that were coupled to them in FIG. 4a, it is also possible in the same or alternative configuration, to receive audio packets associated with the one or more tags associated with the audio content received via the rx antenna(s) 430.

As such, after a selection of the at least one target object external to the first device is performed by the target object selector 414, a command interpreter 416, integrated into one or more of the processors in the first device, a channel of communication between the first device and a second device associated with the at least one target object external to the first device. In response to the selection of at least one target object external to the first device audio packets may be received from a second device.

The one or more tags, from the second device, may be received in the metadata, read from the buffer 444, and extracted, and used to identify the audio content. The audio content may be output based on the selection of the at least one target object external to the first device. In some scenarios, the one or more tags may represent a stream from cloud associated with remote devices (i.e., secondary devices).

Figure 5:
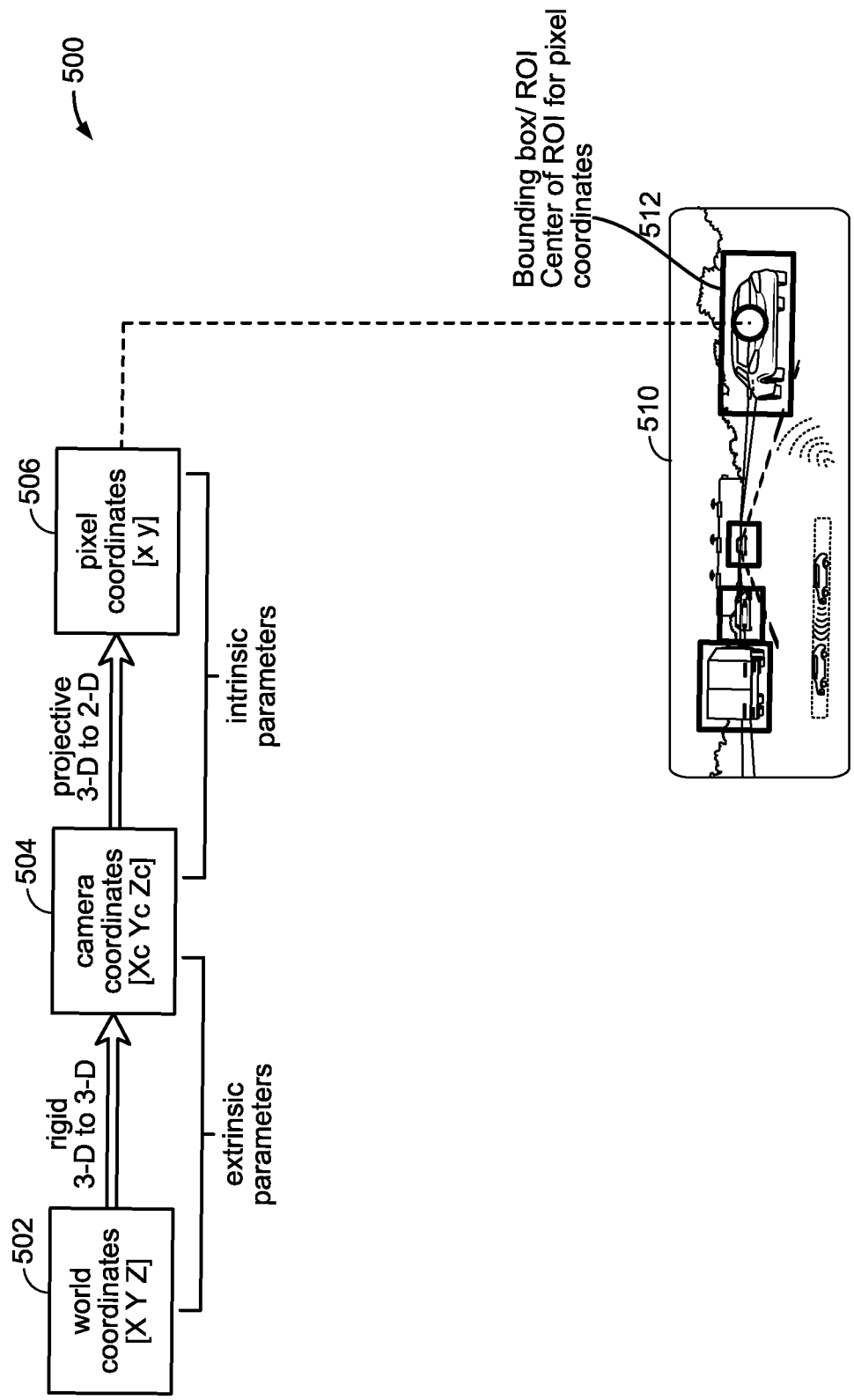
FIG. 5 illustrates a conceptual diagram of transformation of world coordinates to pixel coordinates according to the techniques described in this disclosure

FIG. 5 illustrates a conceptual diagram 500 of transformation of world coordinates to pixel coordinates according to the techniques described in this disclosure. An external camera mounted on a first vehicle (e.g., 310b in FIG. 3, 402 in FIG. 4a and FIG. 4b), may capture images (e.g. video frames) and represent objects in the three-dimensional (3D) world coordinates [x, y, z] 502. The wold coordinates may be transformed into 3D camera coordinates [xc, yc, zc] 504. The 3D camera coordinates 504 may be projected into a 2D x-y plane (perpendicular to the direction normal vector of the face of the camera (310b, 402), and represent the objects of the images in pixel coordinates ($x_p$, $y_p$) 506. A person having ordinary skill in the art, would recognize that this transformation from world coordinates to pixel coordinates is based on transforming the world coordinates [x y z] using an input rotation matrix [R], a translation vector[t], and camera coordinates [$x_c$, $y_c$, $z_c$]. For example, the camera coordinates may be represented as [xc, yc, zc]=[x y z]*[R]+ t, where the rotation matrix, [R], is a 3×3 matrix, and the translation vector, is a 1×3 vector.

A bounding box of a region of interest (ROI) may be represented in pixel coordinates ($x_p$,$y_p$) on a display device 510. There may be a visual designation (e.g. a color change or icon or synthetic pointer augmented inside the bounding box 512, to alert a passenger in the vehicle that the target object (e.g., the second vehicle) has been selected to initiate communication with.

Figure 6A:
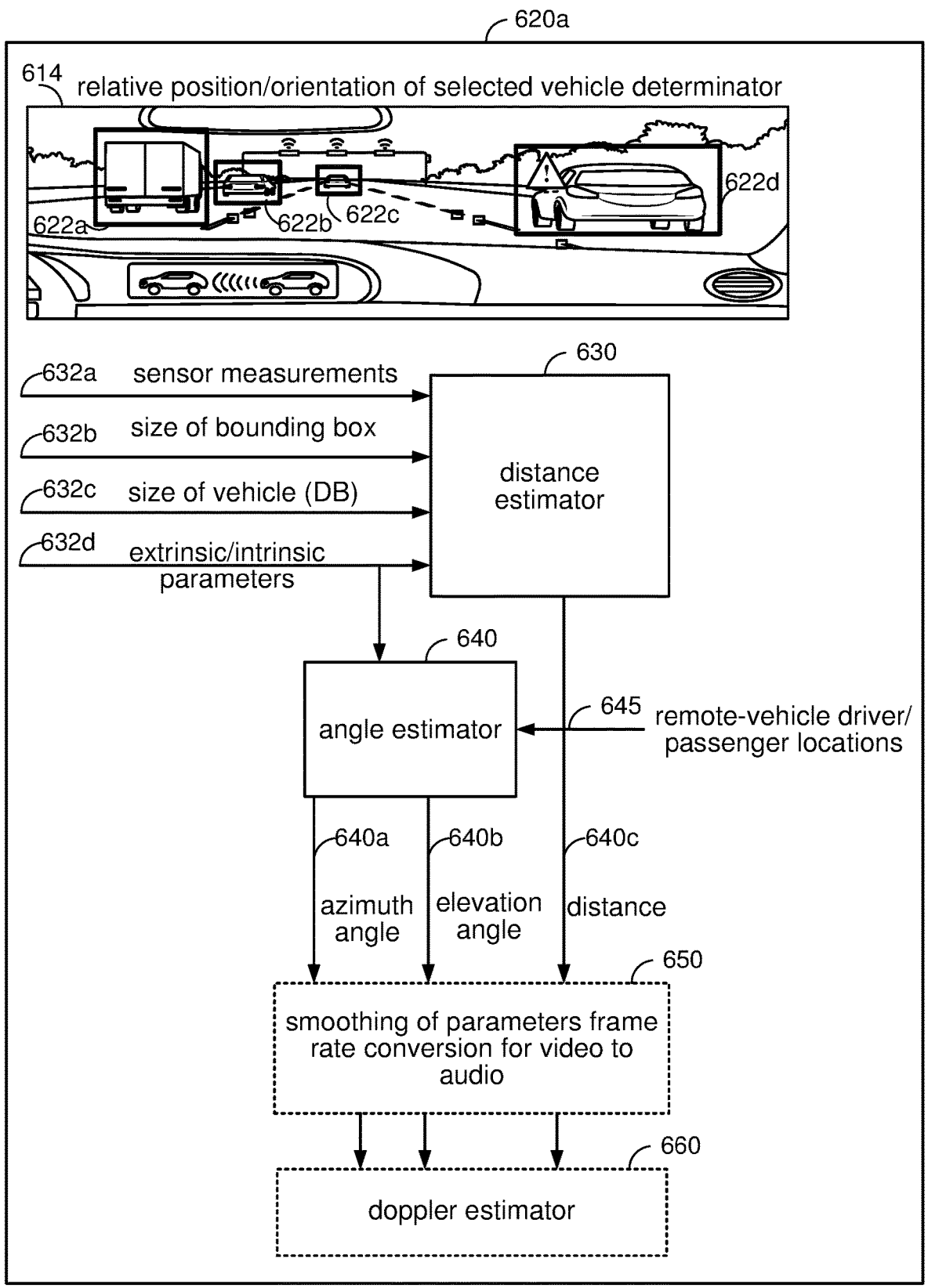
FIG. 6a illustrates a conceptual diagram of one embodiment of the estimation of distance and angle of a remote vehicle/passenger (e.g. a second vehicle).

FIG. 6a illustrates a conceptual diagram of one embodiment of the estimation of distance and angle of remote vehicle/passenger (e.g. a second vehicle). The distance may be derived from the bounding box 622d in a video frame. A distance estimator 630 may receive the sensor parameters 632a, intrinsic and extrinsic parameters 632d of the outward-looking camera (310b, 402) and the size 632b of the bounding box 622d. In some embodiments, there may be a vehicle information database which includes the size 632c of a different vehicles and may also contain certain image characteristics that may aid in the identification of a vehicle.

The distance and angle parameters may be estimated at the video frame-rate and interpolated to match the audio frame-rate. From the database of vehicles, the actual size i.e. width and height of the remote vehicle may be obtained. The pixel coordinates ($x_p$, $y_p$) of a corner of the bounding box may correspond to a line in 3D world coordinates with a given azimuth and elevation.

Figure 6B:
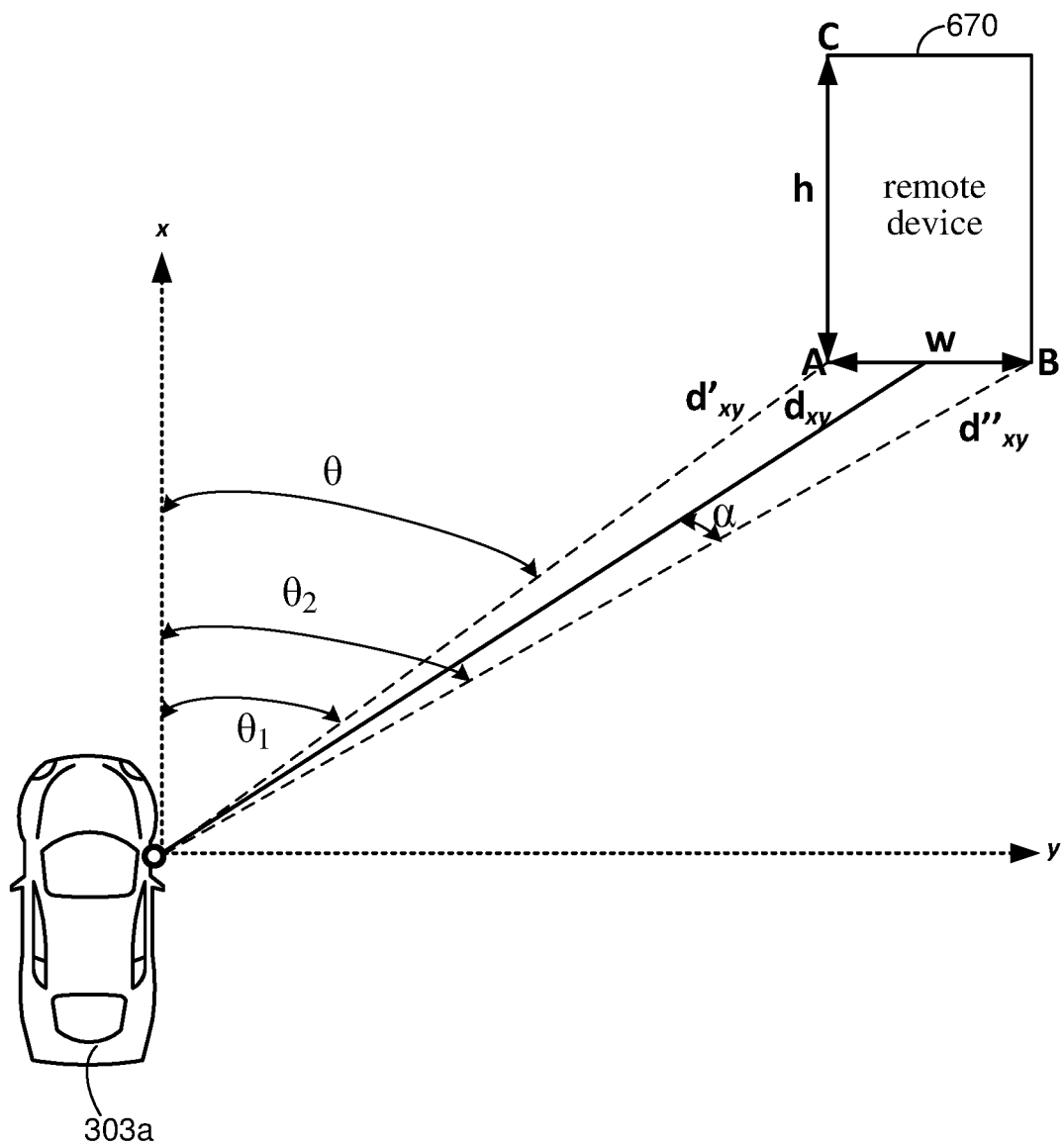
FIG. 6b illustrates a conceptual diagram of the estimation of distance and angle in the x-y plane of a remote device.

Using the left bottom corner and right bottom corner of the bounding box for example, and having the width of the vehicle, w, the distance, d, and azimuth angle (θ) 640a, may be estimated as shown in FIG. 6b.

FIG. 6b illustrates a conceptual diagram of the estimation of distance 640c and angle 640a in the x-y plane of a remote device.

Point A in FIG. 6b may be represented by world coordinates (a, b, c) Point B in FIG. 6b may also be represented by world coordinates (x, y, z). The azimuth angle (θ) 640a may be represented as ($θ_1+θ_2$)/2. For small angles the distance $d_{xy}$*(sin $θ_1$−sin $θ_2$ is approximately w, which is the width of the remote device in FIG. 6b. The world coordinates (x, y, z) and (a,b,c) may be expressed in terms of the width in the x-y plane, for example using the following formulations:

$$x=a$$

$$|y-b|=w$$

$$z=c$$

The pixel coordinates described in FIG.5 may be expressed as $x_p=x=a$ and $y_p=y=w+/-b$.

Figure 6C:
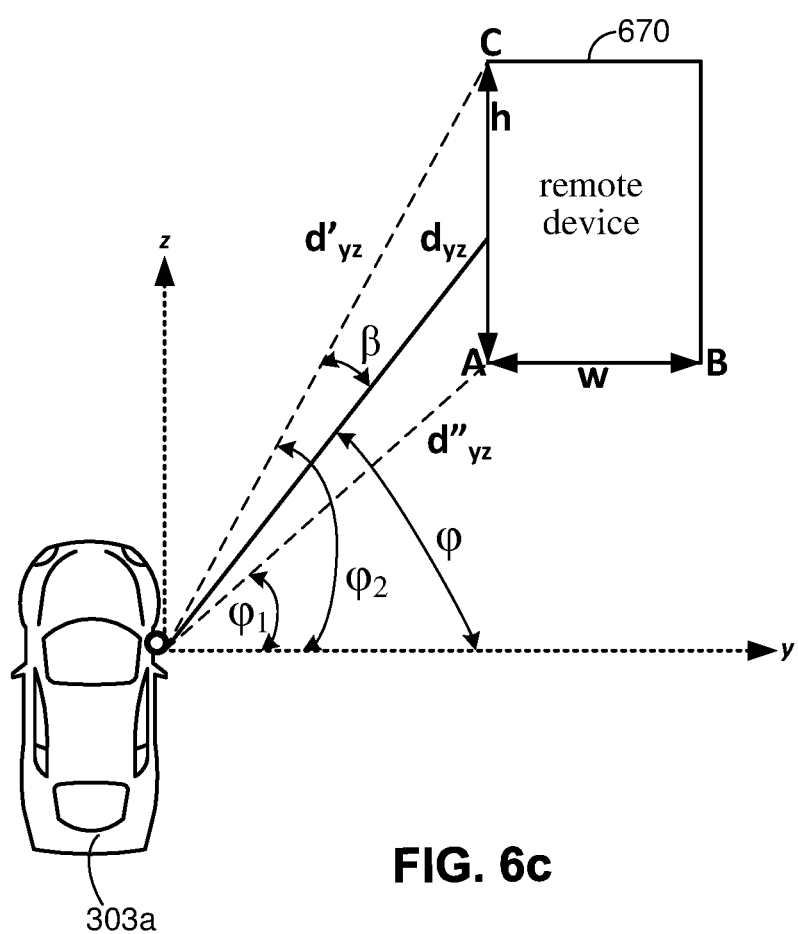
FIG. 6c illustrates a conceptual diagram of the estimation of distance and angle in the y-z plane of a remote device.

Similarly, using left bottom corner and left top corner of the bounding box and knowing the height h of the second vehicle 303b, the elevation angle (φ) 640b of the second vehicle 30b, and the second vehicle's distance $d_{yz}$ may be computed as shown in FIG. 6c.

FIG. 6c illustrates a conceptual diagram of the estimation of distance and elevation angle 640b in the y-z plane of a remote device.

Point A in FIG. 6c may be represented by world coordinates (a, b, c) Point B in FIG. 6c may also be represented by world coordinates (x, y, z). The elevation angle (φ) 640b may be represented as $(\varphi_1+\varphi_2)/2$. For small angles the distance $d_{yz}*(\sin \varphi_1-\sin \varphi_2)$ is approximately h, which is the height of the remote device in FIG. 6c. The world coordinates (x, y, z) and (a, b, c) may be expressed in terms of the height in the y-z plane, for example using the following formulations:

$$x=a$$

$$y=b$$

$$|z-c|=h$$

The pixel coordinates described in FIG.5 may be expressed as $x_p=x=a$, and $y_p=y=b$.

Further adjustments to the elevation angle 640b and azimuth angle 640a may be made for sounds coming from the left half, the right half, or the middle of the remote device 670 depending on the location of the sound source. For example, if the remote device 670 is a remote vehicle (e.g., a second vehicle), the location of the sound source may depend on whether the driver is speaking, or the passenger is speaking. For example, the driver side (left) azimuth angle 640a for remote vehicle may be represented as $(3*\theta_1+\theta 2)/4$. This provides an azimuth angle 640a that is in the left half of the vehicle denoted in FIG. 8.

The video framerate typically does not match the audio framerate. To compensate for the misalignment of the framerates in different domains (audio and video), the parameters distance 640c, elevation angle, φ, azimuth angle 640a, θ, may be interpolated for each audio frame as a linear interpolation from the values corresponding to previous two video frames. Alternatively, the value from a recent video frame may be used (sample and hold). Furthermore, the values may be smoothed by taking the median (outlier rejection), or mean value from the past several video frame at the cost of decreased responsiveness.

The distance 640c, d, shown in FIG. 6a may be $d_{xy}$, or $d_{yz}$, or some combination of $d_{xy}$, and $d_{yz}$, e.g., the average. In some embodiments, it may be desirable to neglect the height difference between the first vehicle and the remote device 670, e.g., if the remote device 670 is at the same height of the first vehicle. Another example may be that the listener in the first vehicle configures settings to receive the spatial audio by projecting the z-component of the sound-field emanating from the remote device 670 projected into the x-y plane. In other examples, the remote device 670 may be a drone (e.g., flying around playing music) or the there may be a device in a tall building that is streaming music. In such examples, it may be desirable to have the angle estimator 630 output an elevation angle, or have the other optional blocks also operate on them. That is to say, have the smoothing of parameters frame rate conversion for video to audio 640 operate also on the elevation angle, and produce a smoother version of the elevation angle. As vehicles and/or remote devices will likely be moving around, the relative change in frequency of sounds may be accounted for by a doppler estimator 650. Thus, it may be desirable for a listener in the first vehicle to additionally hear the sounds of the remote device, e.g. the second vehicle, with a doppler effect. The doppler estimator 650 may increase or decrease the change in frequency (i.e., the pitch) of that the listener in the first vehicle hears, as the remote device 670 gets closer or further away from the first vehicle. As the remote device 670 gets closer to the first vehicle, the sound if propagating through air reaches the listener as a higher frequency because the pressure wave of sound is compressed by the remote device approaching the first device. In the case where the audio signal (or audio content) is compressed and received as part of a radio-frequency signal, there is not a doppler shift that it perceptible by human hears. Thus, the doppler estimator 650 has to compensate and use the distance and angle to create the doppler effect. Similarly, when the remote device 670 is moving away from the first vehicle, a pressure sound wave of the audio signal (or audio content) would be expanded if propagating through air, and results in a lower-pitched sound. The doppler estimator 650 would compensate for what would be the lower frequency effect as the audio signal (or audio content) is compressed in a bitstream and also transmitted by the remote device and received by the first vehicle using radio-frequency waves according to a modulation scheme that is part of an air-interface for a C-V2X or V-2VX communication link. Or, if the remote device is not a vehicle, a different type of communication link and air-interface may be used.

Figure 7A:
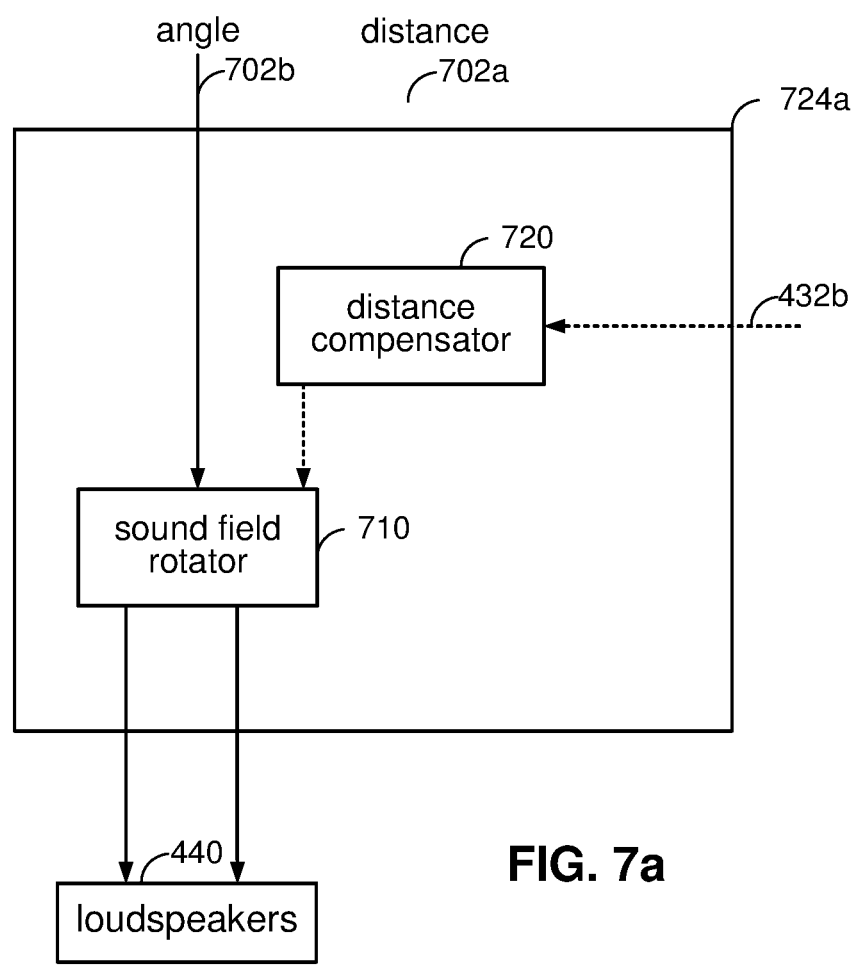
FIG. 7a illustrates an embodiment of an audio spatializer according to the techniques described in this disclosure.

FIG. 7a illustrates an embodiment of an audio spatializer 724a according to the techniques in this disclosure. In FIG. 7a, a reconstructed soundfield is rendered into loudspeaker feeds that are provided to loudspeakers 440 or headphones or any other audio delivery mechanism. The reconstructed soundfield may include spatial effects which were provided to account for the distance and azimuth/elevation of the device (e.g. a remote vehicle or wearable), relative to the person 111 in vehicle 303a (or another wearable).

A distance 702a (e.g. that comes out of distance estimator 630, parameters frame rate conversion for video to audio smoother 650, or doppler estimator 660) may be provided to a distance compensator 720. The input to the distance compensator 720 may be an audio signal (or audio content). The audio signal (or audio content) may be a the output of a codec 438. The codec 438 may output a pulse-coded-modulated audio signal. The PCM audio signal may be represented in the time domain or frequency domain. The distance effects may be added as a filtering process, finite impulse response (FIR), or Infinite Impulse Response (IIR) with an additional attenuation that is proportional to the distance (e.g., 1/distance may be the attenuation applied). An optional parameter (gain) may also be applied to turn up the gain for intelligibility. Moreover, reverberation filters are one example of distance simulator filters.

Another distance cue that may be modeled and added to the audio signal (or audio content) is the doppler effect described with respect to the doppler estimator 650 in FIG. 6c. The relative velocity of the remote vehicle is determined by computing the rate of change of distance per unit time, and the distance and angle is used to provide the doppler effect as described above.

Figure 7B:
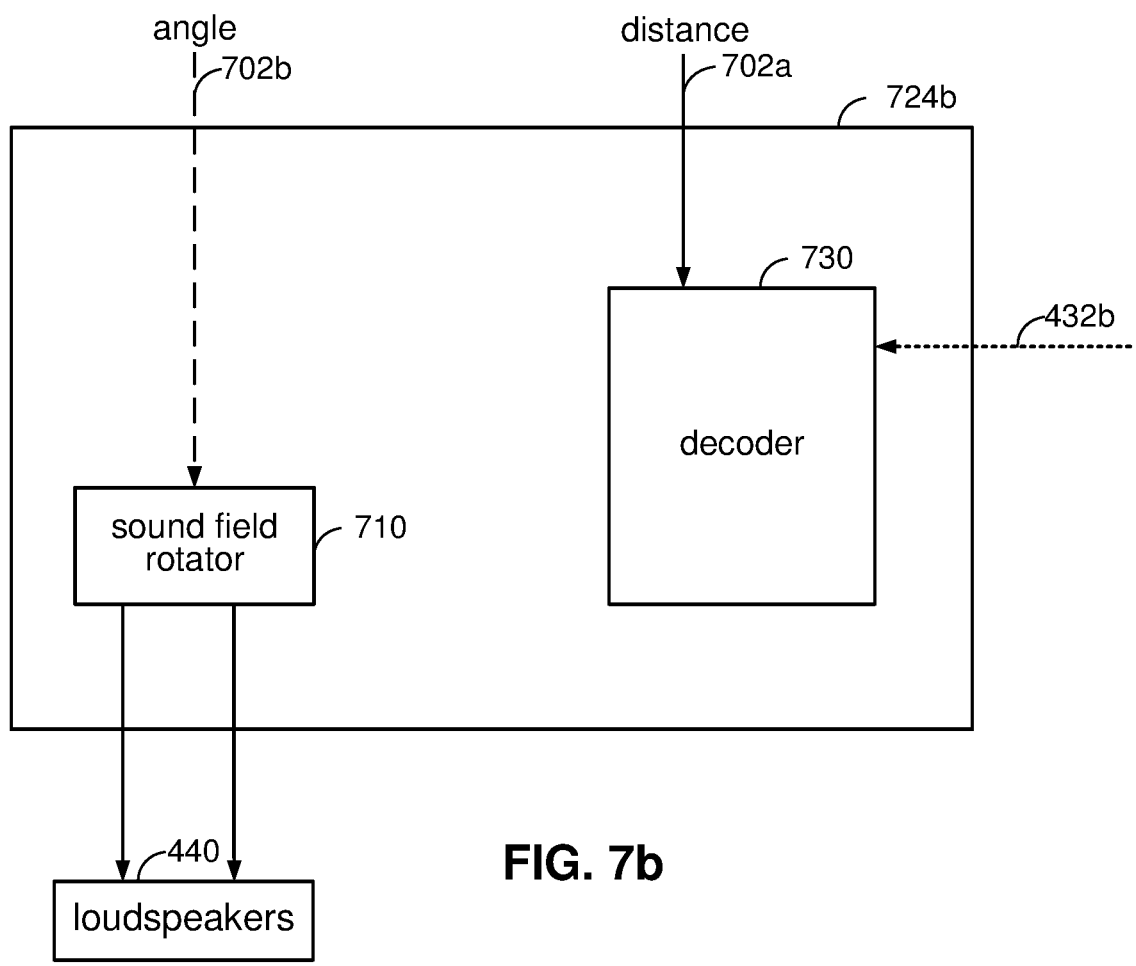
FIG. 7b illustrates an embodiment of an audio spatializer which includes a decoder used according to the techniques described in this disclosure.

The sound field rotator 710 may use the output of the distance compensator 720 and an input angle 702b (e.g., the azimuth angle 640a, elevation angle 640b, or a combination of based on these angles) and may pan the audio from the remote device (e.g., the second vehicle) to the intended azimuth angle and elevation angle. The input angle 720b may be converted to be output at an audio frame interval instead of a video frame interval by the smoothing of parameters frame rate conversion for video to audio 650. Another embodiment that may include a sound field rotator 710 without an inter-dependence to the distance is illustrated in FIG. 7b. The panning may be achieved among other means by using object-based rendering techniques such as vector based amplitude panning (VBAP), ambisonics based renderers, or by using a high resolution head-related transfer function (HRTF) for headphone based spatialization and rendering.

FIG. 7b illustrates an embodiment of an audio spatializer 424 which includes a decoder used according to the techniques described in this disclosure. In FIG. 7b, decoder 724b may utilize the distance 702a information in the decoding process. Additional distance effects may be applied as described in FIG. 7a. A decoder 730 may be configured to ignore the highest frequency bins when decoding for a distance larger than a certain threshold. The distance filters may smear out these higher frequencies and there may not be a need to maintain the highest fidelity in these frequency bins. In addition, a doppler shift may be applied in the frequency domain during the decoding process to provide a computationally efficient implementation of the doppler effect. Reverb and other distance filtering effects may also be efficiently implemented in the frequency domain and lend themselves to be integrated with the decoding process. During the decoding process, the rendering and/or binauralization may also be applied in the time domain or frequency domain within the decoder to result in the appropriately panned loudspeaker feeds at the output of the decoder.

The decoder 730 may be a speech decoder, or an audio decoder or a combined speech/audio decoder that is able to decode audio packets that include compressed speech and music. The input to the decoder 730 may be a stream from a cloud server associated with the remote device or remote devices. That is, there may be multiple streams as inputs 432b. The cloud server may include the streaming of music or other media. The input to the decoder 730 may also be compressed speech and/or music directly from the remote device (e.g., the remote vehicle).

Figure 8:
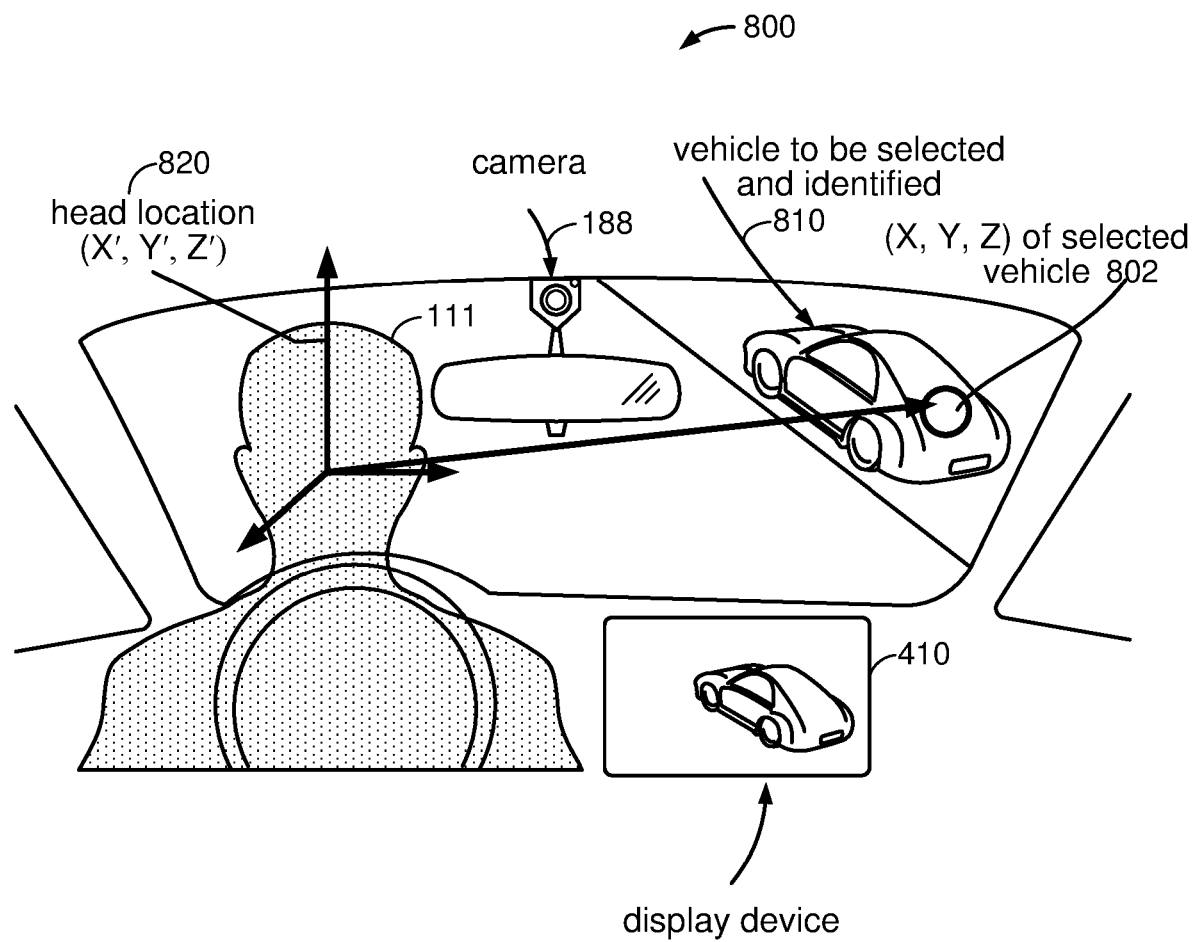
FIG. 8 illustrates an embodiment where the location of a person in a first vehicle and selected (remote) vehicle may be in the same coordinate system.

FIG. 8 describes an embodiment 800 where the location of the person 111 in the first vehicle and selected (remote) vehicle 810 may be in the same coordinate system. The angle and distance relative to the external camera previously described may need to be readjusted with respect to the head location 820 (X', Y', Z') of a person 111 in the first vehicle. The selected remote device (e.g. the remote vehicle 303b) location (X, Y, Z) and the first vehicle 303a's location (X, Y, Z) 802 may be computed from distance and azimuth/elevation angles as follows. X=d*cos(azimuth), Y=d*sin(azimuth) and Z=d*sin(elevation). The head location 820 from the inside facing camera 188 (of the first vehicle) may be determined and translated to the same coordinate system as the first vehicle's coordinates to obtain X', Y' and Z'820. Given X, Y, Z 802 and X', Y', Z' 820, the updated distance and angles relative to person 111 can be determined using trigonometric relationships. d=sqrt[(X−X')^2+(Y−Y')^2+(Z−Z')^2] and azimuth=asin[(Y−Y')/d] and elevation=asin[(Z−Z')/d]. These updated d and angles could be used for finer spatialization and distance resolution and better accuracy.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a device with computing capabilities.

The program code, or instructions may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold devices." A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example may be that any of the transceivers or antennas described herein that may be "coupled" to a processor, but not necessarily part of the package that includes a video device. Other examples may be inferred from the context disclosed herein, including this paragraph, when using the term "integrated".

As used herein "a wireless" connection between devices may be based on various wireless technologies, such as may be "wirelessly connected" based on different cellular communication systems, such as, V-2X and C-V2X. C-V2X allows for direct communication (via a "sidelink") between a vehicle and other devices without the use of a base station. In such instances, the devices may be "wirelessly connected via a sidelink".

Long-Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. In addition, two devices may be wirelessly connected based on Bluetooth, Wireless-Fidelity (Wi-Fi), or variants of Wi-Fi (e.g. Wi-Fi Direct). When two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

As used herein A "and/or" B may mean that either "A and B," or "A or B," or both "A and B" and "A or B" are applicable or acceptable.

As used herein, a unit can include, for example, a special purpose hardwired circuitry, software and/or firmware in conjunction with programmable circuitry, or a combination thereof.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

Various examples have been described. These and other examples are within the scope of the following claims.

What is claimed is:

1. A first device capable of communication with a second device, the first device comprising:
    one or more processors configured to:
        detect a selection of at least one target object external to the first device;
        initiate a channel of communication between the first device and a second device associated with the at least one target object external to the first device;
        receive audio packets, from the second device, in response to the selection of at least one target object external to the first device;
        decode the audio packets, received from the second device to generate an audio signal;
        apply a spatialization effect on the audio signal based on the selection of the at least one target object external to the first device;
        output the audio signal with the spatialization effect;
        disable a spatialization effect on the output of the audio signal after the second device is more than a configurable distance away from the first device;
        continue to receive the audio packets and decode the audio packets, received from the second device to generate the audio signal; and
        output the audio signal without the spatialization effect; and
    a memory, coupled to the one or more processors, configured to store the audio packets before and after the spatialization effect is applied.

2. The first device of claim 1, wherein the representation of the at least on target object relative to the first device is based on features of an image, the image, or both the image and features of the image, wherein the image captured by one or more cameras, coupled to the first device.

3. The first device of claim 1, further comprising one or more transmitter antenna, coupled to the one or more processors, configured to send communication data to the second device, by the one or more processors, of the channel of communication between the first device and the second device associated with the at least one target object external to the first device.

4. The first device of claim 1, further comprising one or more receive antenna, coupled to the one or more processors, configured to receive the audio packets based on the result of the channel of the communication between the at least one target object external to the first device and the first device.

5. The first device of claim 1, wherein the selection of the at least one target object is based on detection of a command signal based on keyword detection.

6. The first device of claim 1, further comprising a display device configured to represent the at least one target object external to the device, and wherein the selection of the at least one target object external to the device is based on a capacitive sensor, or ultrasound sensor on the display device changing state.

7. The first device of claim 1, wherein the selection of the at least one target object is based on detection of a command signal based on eye gaze detection.

8. The first device of claim 1, where the relative position of the second device is represented as an image of the second device on the display device.

9. The first device of claim 1, wherein the output of audio signal is a three-dimensional spatialized audio signal.

10. The first device of claim 9, further comprising a display device that is configured to represent the relative position of the second device, and wherein the output of the three-dimensional spatialized audio signal is based on where the relative position of the second device is represented on the display device.

11. The first device of claim 9, further comprising a Global Positioning Satellite (GPS) receiver, coupled to the one or more processors, configured to aid the device perform assisted GPS to determine the relative position of the second device, and wherein the output of the three-dimensional spatialized audio signal of the selection of the at least one target object external to the first device is based on the assisted GPS.

12. The first device of claim 9, further comprising one or more sensors, coupled to the one or more processors, configured to aid in the estimate of the relative position of the second device.

13. The first device of claim 9, wherein the one or more processors are configured to output the three-dimensional spatialized audio signal at a different spatial resolution when the second device is at a first location relative to the first device, as compared to a second location relative to the second device.

14. The first device of claim 9, wherein the one or more processors are configured to receive an updated estimate of the relative position of the at least one target object external to the first device based on tracking of the at least one target object external to the first device, and wherein the one or more processors are configured to output the three-dimensional spatialized audio signal based on the updated estimate relative position of the at least one target object external to the device.

15. The first device of claim 14, further comprising two or more loudspeakers, coupled to the one or more processors, configured to render the three-dimensional spatialized audio signal based on the relative position of each vehicle of the multiple vehicles.

16. The first device of claim 1, wherein the device is a first vehicle.

17. The first device of claim 1, wherein one the target object is a secondary vehicle, and wherein multiple target objects in the at least one target object comprises multiple vehicles that are external to the device.

18. The first device of claim 17, wherein the one or more processors in the first vehicle are configured to receive the audio packets in a separate communication channel from each of the multiple vehicles, and each of the multiple vehicles are secondary vehicles.

19. The first device of claim 18, wherein the audio packets represent speech spoken by at least one person in each vehicle of the secondary vehicles.

20. The first device of claim 19, wherein the one or more processors are configured to authenticate each of the person or vehicles of the secondary vehicles, to facilitate a trusted multi-party conversation between at least one person in a secondary vehicle and a person in the first vehicle.

21. The first device of claim 20, wherein the configurable distance is a distance measurement or a time measurement.

22. A method comprising a first device in communication with a second device, the method comprising:
  detecting a selection of at least one target object external to the first device;
  initiating a channel of communication between the first device and a second device associated with the at least one target object external to the first device;
  receiving audio packets, from the second device, in response to the selection of at least one target object external to the device;
  decoding the audio packets, received from the second device, to generate an audio signal;
  applying a spatialization effect of the audio signal based on the selection of the at least one target object external to the first device;
  outputting the audio signal with the spatialization effect;
  disabling a spatialization effect on the output of the audio signal after the second device is more than a configurable distance away from the first device;
  continuing to receive the audio packets and decode the audio packets, received from the second device to generate the audio signal; and
  outputting the audio signal without the spatialization effect.

23. The method of claim 22 wherein the configurable distance is a distance measurement or a time measurement.

24. The method of claim 22, wherein the representation of the at least on target object relative to the first device is based on features of an image, the image, or both the image and features of the image.

25. The method of claim 22, wherein the selection of the at least one target object is based on detection of a command signal based on keyword detection.

26. An apparatus comprising:
  means for detecting a selection of at least one target object external to the first device;
  means for initiating a channel of communication between the first device and a second device associated with the at least one target object external to the first device;
  means for receiving audio packets, from the second device, in response to the selection of at least one target object external to the device;
  means for decoding the audio packets, received from the second device, to generate an audio signal;
  means for applying a spatialization effect of the audio signal based on the selection of the at least one target object external to the first device;
  means for outputting the audio signal with the spatialization effect;
  means for disabling a spatialization effect on the output of the audio signal after the second device is more than a configurable distance away from the first device;
  means for continuing to receive the audio packets and decode the audio packets, received from the second device to generate the audio signal; and
  means for outputting the audio signal without the spatialization effect.

27. A non-transitory computer-readable medium storing computer-executable code, the code executable by one or more processors to:
  detect a selection of at least one target object external to a first device;
  initiate a channel of communication between the first device and a second device associated with the at least one target object external to the first device;
  receive audio packets, from the second device, in response to the selection of at least one target object external to the device;
  decode the audio packets, received from the second device, to generate an audio signal;
  apply a spatialization effect of the audio signal based on the selection of the at least one target object external to the first device;
  output the audio signal with the spatialization effect;
  disable a spatialization effect on the output of the audio signal after the second device is more than a configurable distance away from the first device;
  continue to receive the audio packets and decode the audio packets, received from the second device to generate the audio signal; and
  output the audio signal without the spatialization effect.

* * * * *